US007693961B2

(12) United States Patent
Nomura et al.

(10) Patent No.: US 7,693,961 B2
(45) Date of Patent: Apr. 6, 2010

(54) METHOD AND SYSTEM FOR SUPPLYING PROGRAMS

(75) Inventors: Tatsuo Nomura, Soraku-gun (JP); Syoichiro Yoshiura, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1021 days.

(21) Appl. No.: 09/892,747

(22) Filed: Jun. 28, 2001

(65) Prior Publication Data

US 2002/0002630 A1 Jan. 3, 2002

(30) Foreign Application Priority Data

Jun. 30, 2000 (JP) ............................. 2000-199122
Jul. 7, 2000 (JP) ............................. 2000-207356

(51) Int. Cl.
*G06F 15/16* (2006.01)
*G06F 9/445* (2006.01)

(52) U.S. Cl. ....................................... 709/219; 717/176
(58) Field of Classification Search ......... 717/162–178; 709/201, 206, 216–224
See application file for complete search history.

(56) References Cited

U.S. PATENT DOCUMENTS

| | | | | | |
|---|---|---|---|---|---|
| 4,446,519 | A | * | 5/1984 | Thomas | 711/164 |
| 4,999,806 | A | * | 3/1991 | Chernow et al. | 717/177 |
| 5,404,199 | A | | 4/1995 | Hirata et al. | 399/8 |
| 5,421,009 | A | * | 5/1995 | Platt | 709/221 |
| 5,555,416 | A | * | 9/1996 | Owens et al. | 717/178 |
| 5,623,604 | A | | 4/1997 | Russell et al. | 717/167 |
| 5,657,448 | A | | 8/1997 | Wadsworth et al. | 709/220 |
| 5,664,195 | A | * | 9/1997 | Chatterji | 717/178 |
| 5,708,709 | A | | 1/1998 | Rose | 705/59 |
| 5,815,722 | A | | 9/1998 | Kalwitz et al. | 717/178 |
| 5,835,911 | A | * | 11/1998 | Nakagawa et al. | 707/203 |
| 5,859,969 | A | * | 1/1999 | Oki et al. | 709/200 |
| 5,881,236 | A | * | 3/1999 | Dickey | 709/221 |
| 6,047,265 | A | * | 4/2000 | Sugimori | 705/26 |
| 6,073,124 | A | | 6/2000 | Krishnan et al. | 705/59 |
| 6,134,593 | A | * | 10/2000 | Alexander et al. | 709/229 |
| 6,195,432 | B1 | * | 2/2001 | Takahashi et al. | 380/277 |

(Continued)

FOREIGN PATENT DOCUMENTS

JP 64-68058 A 3/1989

(Continued)

OTHER PUBLICATIONS

Japanese Notice of Reasons for Refusal mailed Jul. 13, 2004 in corresponding Japanese application No. 2000-207356 and English translaton thereof.

*Primary Examiner*—Yasin M Barqadle
(74) *Attorney, Agent, or Firm*—Nixon & Vanderhye, PC

(57) ABSTRACT

An operating environment of an image forming apparatus 3 is judged, and a program list which indicates programs which can be operated in this operating environment is generated by a server 1. The program list is then supplied to the image forming apparatus 3, and the server 1 is requested to transmit a program selected from the program list. The program is then supplied to the image forming apparatus 3 from the server 1. That is, a program is selected from the program list which indicates programs which are judged to be operable in the operating environment of the image forming apparatus 3. Thereafter, the program is supplied to the image forming apparatus 3.

25 Claims, 12 Drawing Sheets

U.S. PATENT DOCUMENTS

| | | | |
|---|---|---|---|
| 6,243,725 B1 | 6/2001 | Hempleman et al. | 715/530 |
| 6,321,266 B1 | 11/2001 | Yokomizo et al. | 709/226 |
| 6,330,549 B1 * | 12/2001 | Merkle | 705/51 |
| 6,382,757 B1 | 5/2002 | Kakutani | 347/15 |
| 6,418,554 B1 * | 7/2002 | Delo et al. | 717/174 |
| 6,477,703 B1 * | 11/2002 | Smith et al. | 717/168 |
| 6,523,166 B1 * | 2/2003 | Mishra et al. | 717/174 |
| 6,546,554 B1 * | 4/2003 | Schmidt et al. | 717/176 |
| 6,594,737 B2 | 7/2003 | Niwa et al. | 711/154 |
| 6,598,067 B1 * | 7/2003 | Wydra et al. | 718/100 |
| 6,606,744 B1 * | 8/2003 | Mikurak | 717/174 |
| 6,735,625 B1 * | 5/2004 | Ponna | 709/223 |
| 6,766,366 B1 * | 7/2004 | Schafer et al. | 709/223 |
| 2003/0004952 A1 * | 1/2003 | Nixon et al. | 707/10 |

FOREIGN PATENT DOCUMENTS

| | | |
|---|---|---|
| JP | 4-155566 A | 5/1992 |
| JP | 8-190472 A | 7/1996 |
| JP | 9-512126 | 12/1997 |
| JP | 10-91453 A | 4/1998 |
| JP | 10-207710 A | 8/1998 |
| JP | 10-293688 A | 11/1998 |
| JP | 11-144376 A | 5/1999 |
| JP | 2000-207219 A | 7/2000 |
| WO | WO96/35158 | 11/1996 |

* cited by examiner

METHOD AND SYSTEM FOR SUPPLYING PROGRAMS

FIELD OF THE INVENTION

The present invention relates to a method and a system for supplying programs which are sold and purchased via a network.

BACKGROUND OF THE INVENTION

Conventionally, various systems for supplying programs which are sold and purchased via the Internet has been proposed. For example, WO96/35158 (published date: Jul. 11, 1996), discloses an apparatus for selling and purchasing programs via the Internet while protecting copyright of the programs.

Also, Japanese Unexamined Patent Publication No. 68058/1989 (Tokukaisho 64-68058) (published date: Mar. 14, 1989), discloses a facsimile apparatus whose functions can be expanded. This facsimile apparatus obtains programs for operating the expanded functions via communication means, and carries out the programs. Thus, functions which were not provided in the facsimile apparatus when it was purchased can be operated.

However, in the apparatus mentioned in Published Unexamined Patent Application WO96/35158, before purchasing the programs, a user needed to judge an operating environment of the user's terminal such as a personal computer, and to judge whether the program can be operated or not, that is, to judge whether the program can be installed and operated or not in the user's terminal.

After judging that the program can be operated in the operating environment of the user's apparatus, the user downloads the program via the Internet by using the apparatus. Therefore, the user sometimes failed in judging the operating environment of the terminal exactly, or overlooked a part of the operating environment, so that the misjudgment is brought about. For example, if the user misjudges the operating environment to be the one in which the program can be operated while it cannot, it means that the user purchases the useless program.

Also, the facsimile apparatus mentioned in the Tokukaisho 64-68058 merely obtain the program via communication means. Thus, before receiving the program, the user needed to judge whether the program can be operated or not in the operating environment of his/her apparatus. Therefore, when the user failed in judging the operating environment of the apparatus exactly, the program could not be executed and the expanded function could not be operated either.

Further, in recent complex digital image formation apparatuses, after setting basic functions as needed, some functions selected from various expanded functions are complex with the basic functions so as to meet various demands of users. There is no problem in combining the selected functions with the basic functions if it is done at the time of purchase. However, after purchasing the apparatus, the user needs to select a new program, and to judge whether the program can be installed and operated in the terminal apparatus. Therefore, as mentioned above, when the user fails in judging, the user purchases the useless program.

SUMMARY OF THE INVENTION

The object of the present invention, in view of the above problems, is to provide a program supply method and a program supply system which judge whether a program is operable or not in a terminal apparatus and inform the terminal apparatus of a result of judgment in installing a program via the Internet.

In order to solve the above problems, a program supply method of the present invention that supplies programs from a server via the Internet to a terminal apparatus comprises the steps of transmitting data of an operating environment of a user system via a network to the server before supplying the program, judging whether the program is operable or not in the operating environment, and transmitting a result of the judgment from the server via the network to the user system.

According to the method of the present invention like this, whether the program can be operated or not in the operating environment of the user system is judged and the result of the judgment is transmitted to the user system. Thus, servers (distributors) can sell the program which can be operated without fail after confirming that the program is operable. This improves service for supplying programs.

For a fuller understanding of the nature and advantages of the invention, reference should be made to the ensuing detailed description taken in conjunction with the accompanying drawings.

DESCRIPTION OF THE EMBODIMENTS

First Embodiment

The first embodiment of the present invention is described below, based on FIG. 1 to FIG. 8.

Figure 1:
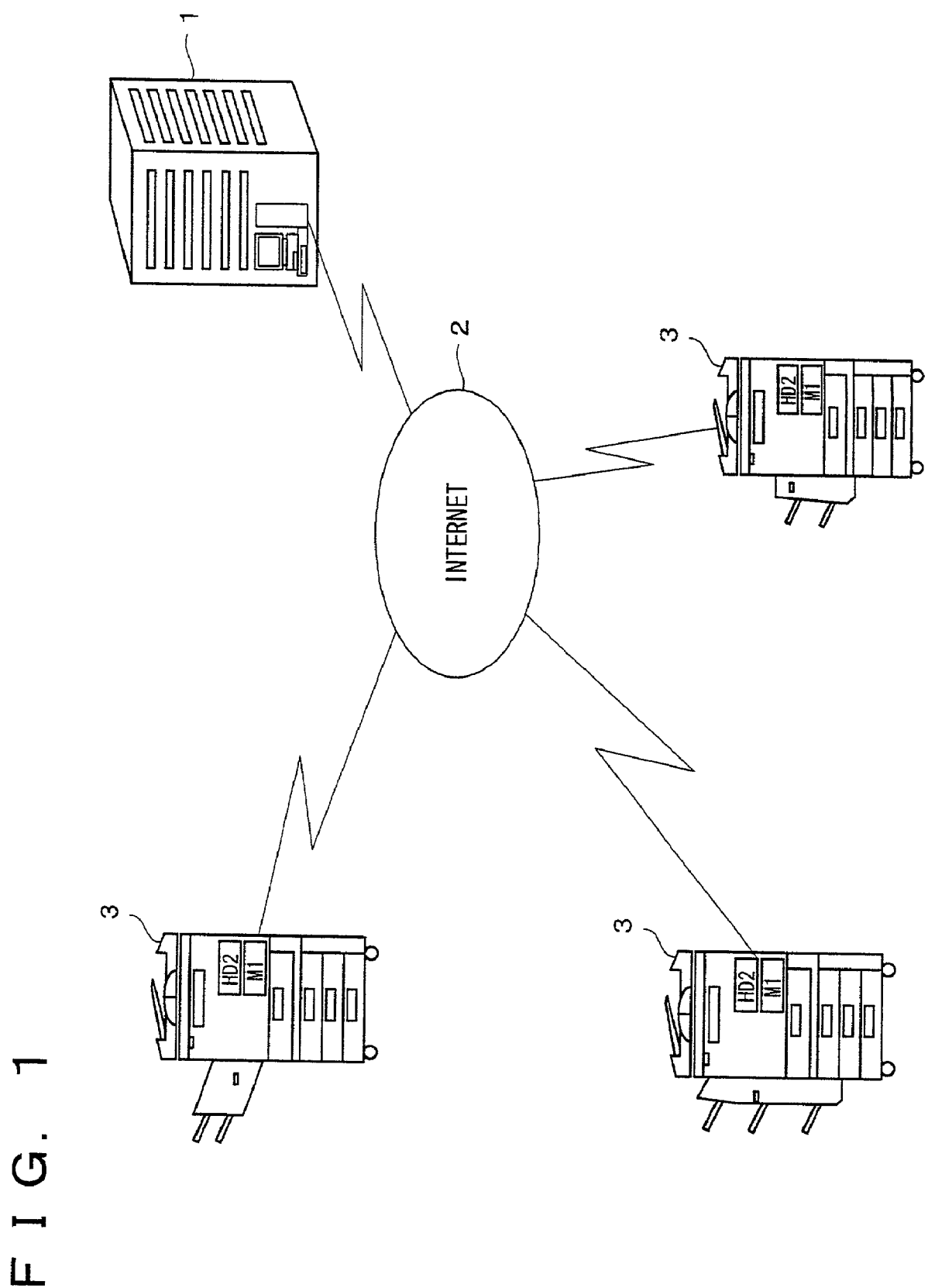
FIG. 1 is a schematic drawing showing an embodiment of a program supply system of the present invention.

FIG. 1 schematically shows an embodiment of a program supply system of the present invention. In this system, a server 1 is connected via the Internet (a network) 2 to a plurality of complex digital image formation apparatuses (hereinbelow referred to as an image formation apparatus) 3. The server 1 is provided on the side of a distributer of programs, and stores many programs. The image formation apparatuses (user systems) 3 are provided respectively on the side of users, and read images of documents and record images on recording sheets.

Figure 2:
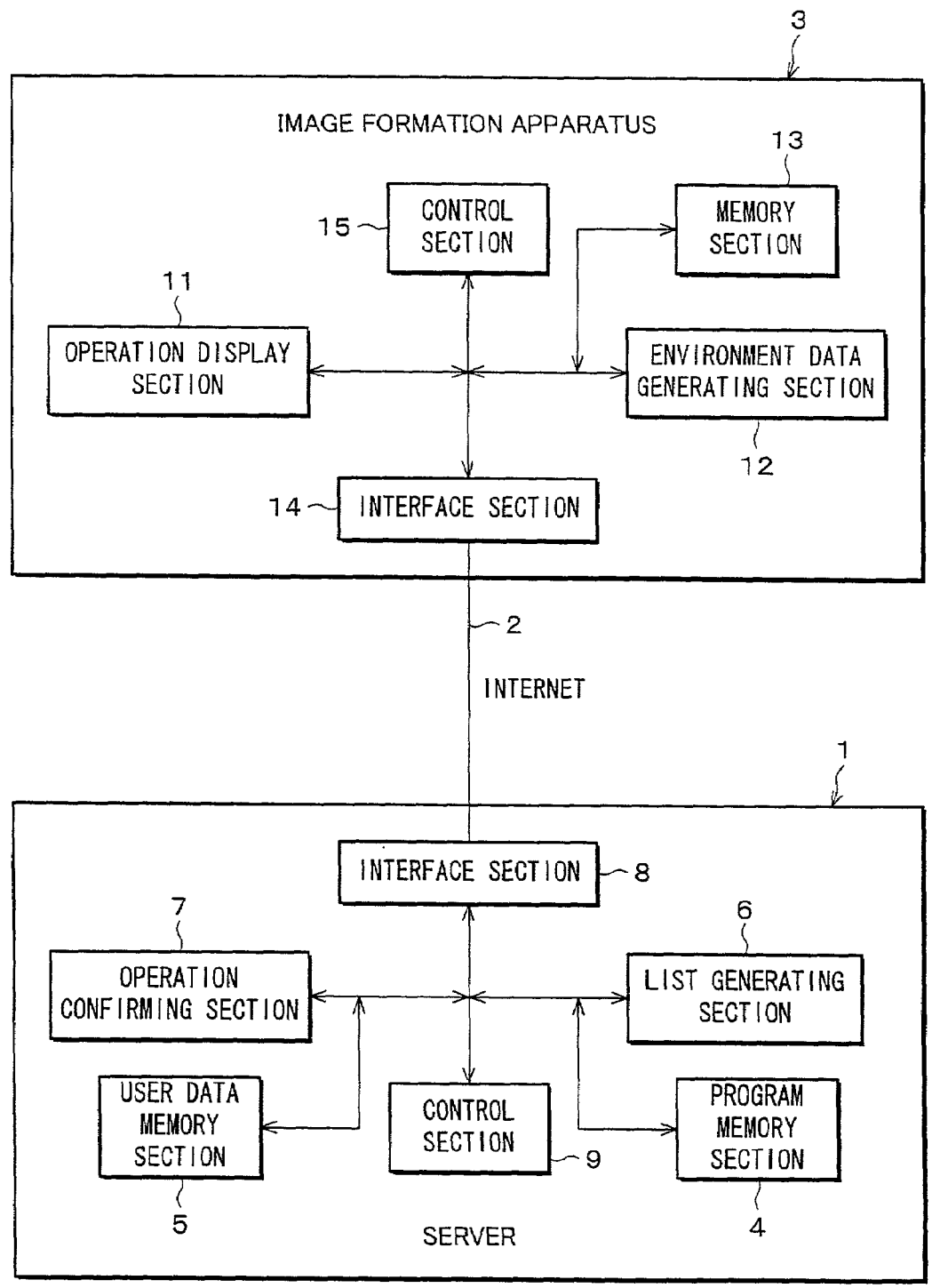
FIG. 2 is a block diagram showing arrangements of a server and a complex digital image formation apparatus in the program supply system of the first embodiment.

FIG. 2 shows arrangements of the server 1 and one of the image formation apparatuses 3. The server 1 includes a program memory section 4 for storing many programs, a user data memory section (recording means) 5 for storing user data, a list generating section (list generating means) 6 for making a program list, an operation judging section (operation judging means) 7 for judging whether a program can be operated or not in the operating environment of the user's terminal, an interface section (server communication means) 8 connected to the Internet 2, and a control section 9 for controlling the server 1 integrally.

Also, the image formation apparatus 3 includes an operation display section (operation input means•display means) 11 having operation keys and a display screen, an environment data generating section (operating environment judging means) 12 for judging an operating environment of the image formation apparatus 3 and for generating the environment data which indicates the operating environment, a memory section 13 for memorizing various programs and data, an interface section (user-side communication means) 14 connected to the Internet 2, and a control section 15 for controlling the image formation apparatus 3 integrally.

Figure 3:
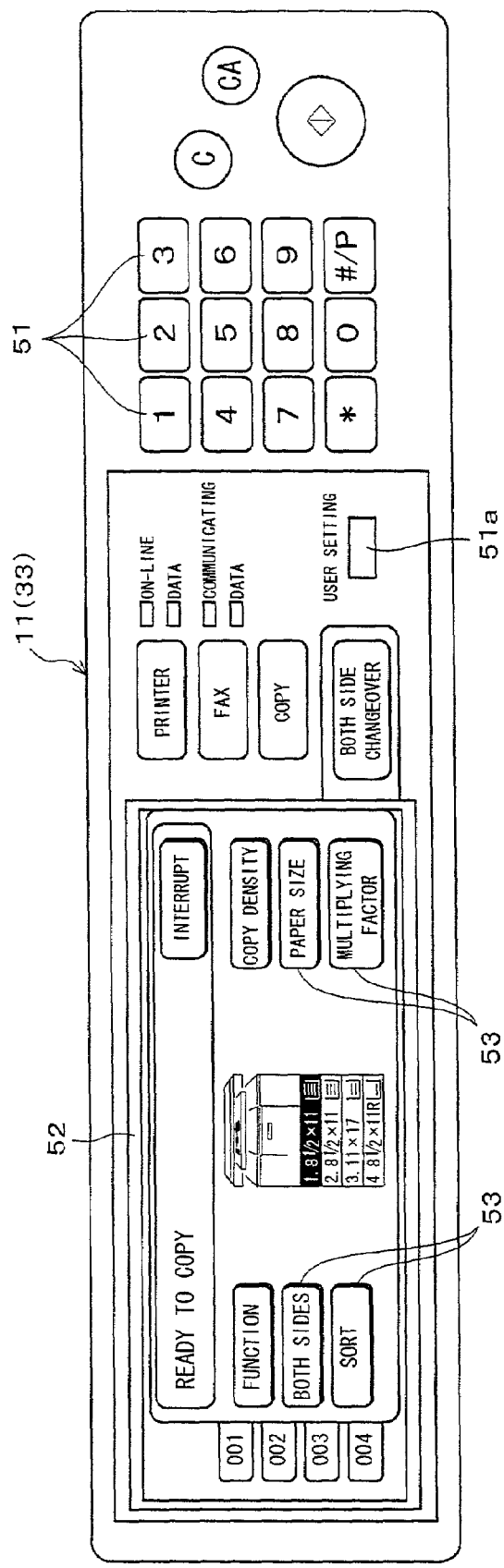
FIG. 3 is a plan view showing an operation display section of the complex digital image formation apparatus in the program supply system in FIG. 1.

FIG. 3 shows the operation display section 11 of the image formation apparatus 3. This operation display section 11 includes a plurality of the operation keys (operation input means) 51, and a display screen 52 (operation input means•display means). By operating the operation keys 51, various instructions can be given to the control section 15. The control section 15 displays various information on the display screen 52. Further, the display screen 52 includes a touch panel (not shown), and when any of operation buttons (operation input means) 53 displayed on the display screen 52 are pushed, the touch panel detects touched location and judges which button was pushed. Thus, various instructions can be given to the control section 15.

Figure 4:
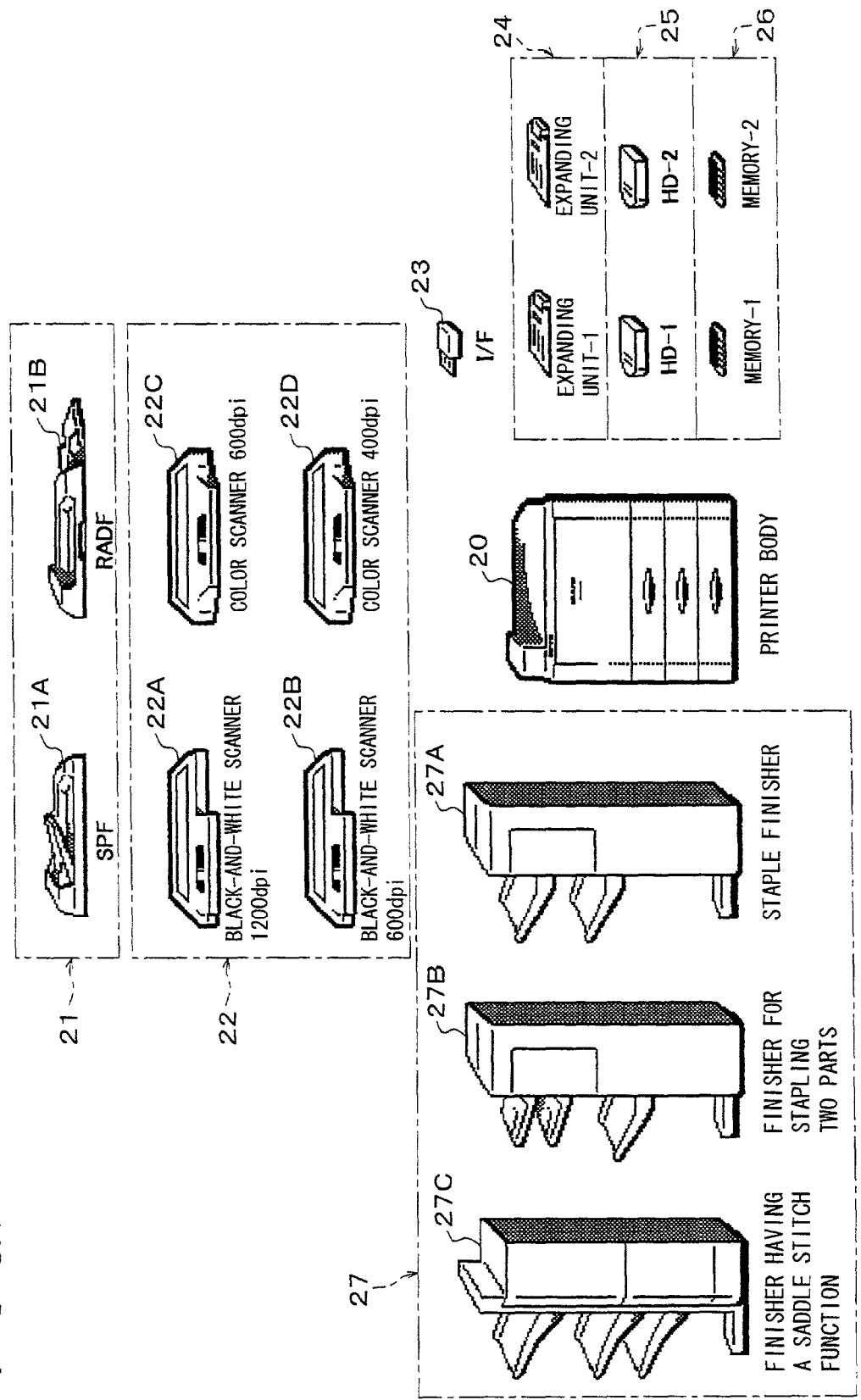
FIG. 4 is an explanatory drawing showing expanded functions of the complex digital image formation apparatus in the program supply system of FIG. 1.

Meanwhile, the image formation apparatus 3, as shown in FIG. 4, is provided with a printer body 20 having basic printer functions, and various optional units are selected and complex with the printer body 20.

FIG. 4 shows various options (expansion units) which are available to the user according to his/her needs with respect to the printer body 20 which is a complex digital image forming apparatus. Examples of such options include an automatic document feeding apparatus 21, a scanner 22, an interface (I/F) 23, an expansion unit 24, a hard disc (HD) 25, a memory 26, a finisher 27, and a sorter. However, not only these options but also other various options meeting users' needs can be used. Further, the options may be used individually or in combination of two or more kinds.

Examples of the automatic document feeding apparatus 21 include an SPF (Sheet Paper Feeder) 21A and an RADF (Reversing Automatic Document Feeder) 21B. Also, examples of the scanner 22 are a black-and-white scanners 22A•22B and color scanners 22C•22D. In each scanner 22, resolution can be selected (in FIG. 4, resolution of the black-and-white scanners 22A•22B is set to 1200 dpi to 600 dpi respectively, and resolution of the color scanner 22C•22D is set to 600 dpi to 400 dpi respectively, but the resolution is not limited to these). Also, as the expanded unit 24, the hard disc 25, and the memory 26, various devices may be used to meet users' needs.

Examples of the finisher 27 include a finisher 27A for stapling only one part, a finisher 27B for stapling two parts, and a finisher 27C also having a saddle stitch function which can be applied to book binding. However, the optional finisher 27 is not just limited to these examples, and other finishers 27 can be used to meet users' needs. Further, various sorters (not shown), as in the finishers, can be used to meet users' needs.

Here, in purchasing the image formation apparatus 3, the user purchases only the printer body 20, or purchases the printer body 20 and some optional units provided on the printer body 20. When the functions are needed to be expanded, the user selects and add other optional units suitably, or changes old units for new ones. In combining and changing the optional units, it is necessary to add and/or update the program for controlling the image formation apparatus 3. Thus, the user obtains the needed program via the Internet 2 from the server 1.

However, when various optional units are complex with the image formation apparatus 3 suitably by the user, the operating environment of the image formation apparatus 3 varies greatly. In order to cope with this change in the operating environment, many programs are provided in the server 1, but it is necessary to grasp the operating environment of the image formation apparatus 3 exactly, and to properly select the programs suitable for the operating environment. If the operating environment is not grasped exactly and a wrong program is selected, not only the image formation apparatus 3 cannot function properly, but the selected program sometimes cannot perform at all and goes to waste. However, grasping the varying operating environment and selecting the programs suitable for the operating environment are a great burden for the user, and the user cannot avoid selecting wrong programs.

Thus, in the present embodiment, before supplying programs, whether the program can be operated or not in the operating environment of the image formation apparatus 3 is judged. A series of processes for this is described below, referring to FIGS. 5 and 6.

First, an operation key 51a of a user setting in the operation display section 11 is pushed. In response, the control section 15 changes a display content of the display screen 52 to a content shown in FIG. 6(a). In the display screen 52, a plurality of operation buttons 53 are displayed, and when an operation button 53 is pushed, the touched location is detected by the touch panel. The control section 15 identifies the pushed operation button 53 based on the touched location, and carries out the process displayed in the operation button 53.

Here, a program is to be supplied so that the functions of the image formation apparatus 3 are expanded. Thus, the operation button 53 displaying "function version up" is pushed. In response, the control section 15 calls the server 1 via the Internet 2, and requests the server 1 to transmit the program list as shown in FIG. 5.

Figure 5:
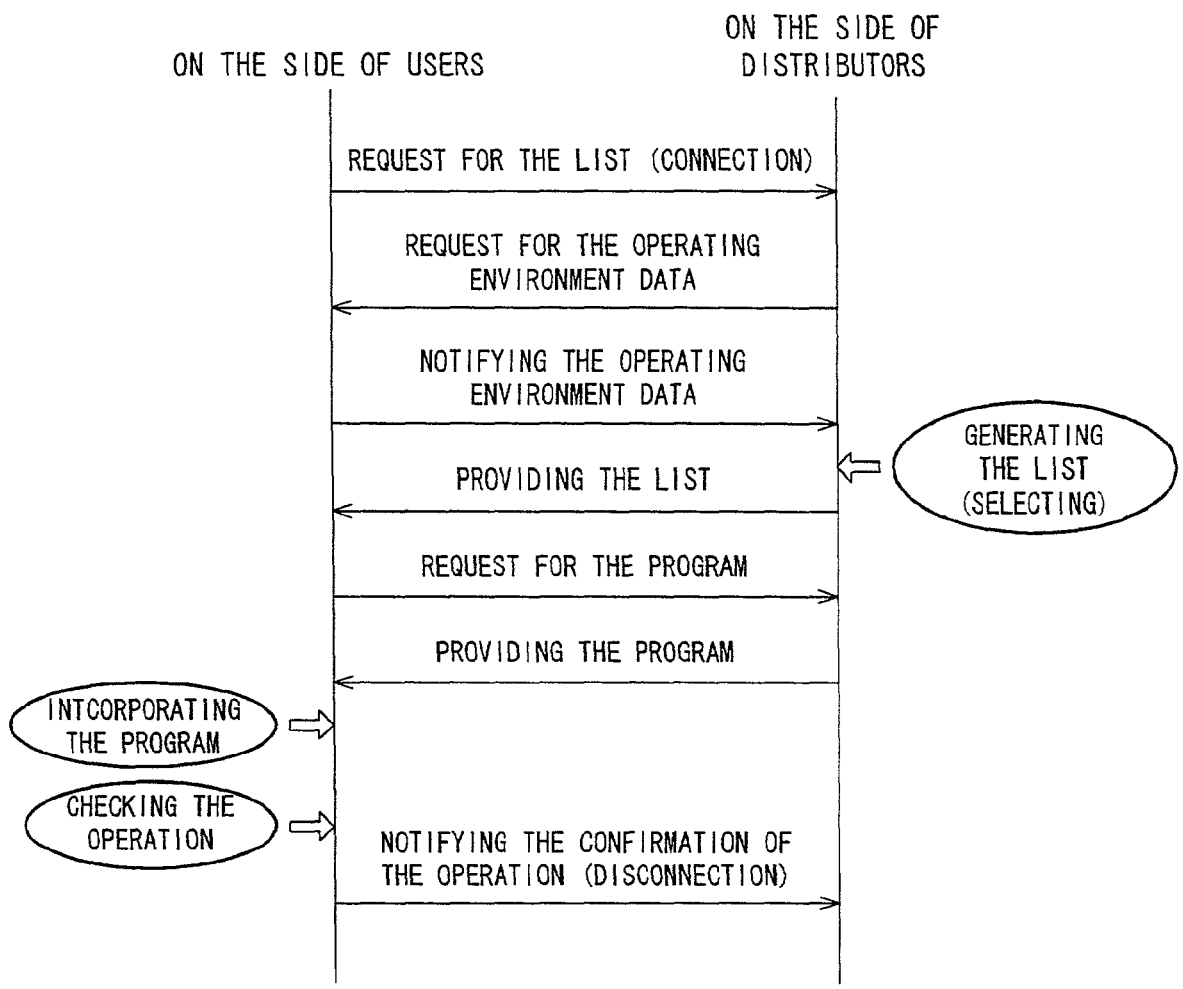
FIG. 5 is an explanatory drawing showing steps of receiving and transmitting of a program between the server and the complex digital image formation apparatus in the program supply system of the first embodiment.
Figure 6:
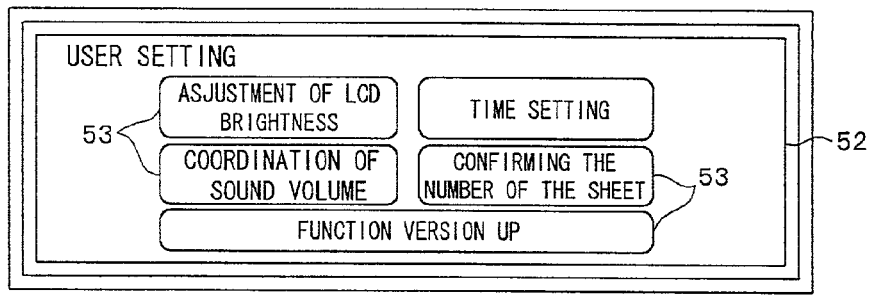
FIG. 6(a) is an explanatory drawing showing a display content displayed on a display screen of the complex digital image formation apparatus in carrying out the steps shown in FIG. 5.
FIG. 6(b) is an explanatory drawing showing a display content displayed on the display screen of the complex digital image formation apparatus in carrying out the steps of FIG. 5.
FIG. 6(c) is an explanatory drawing showing a display content displayed on the display screen of the complex digital image formation apparatus in carrying out the steps of FIG. 5.
FIG. 6(d) is an explanatory drawing showing a display content displayed on the display screen of the complex digital image formation apparatus in carrying out the steps of FIG. 5.
FIG. 6(e) is an explanatory drawing showing a display content displayed on the display screen of the complex digital image formation apparatus in carrying out the steps of FIG. 5.
Figure 6:
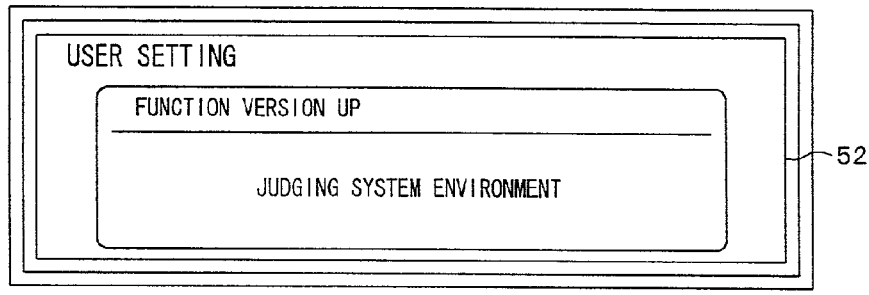
Figure 6:
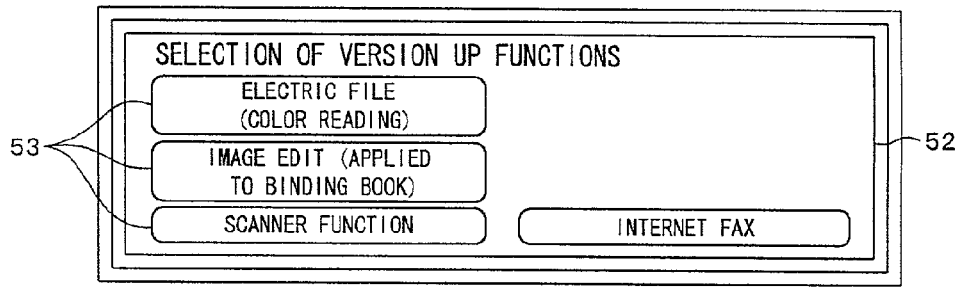
Figure 6:
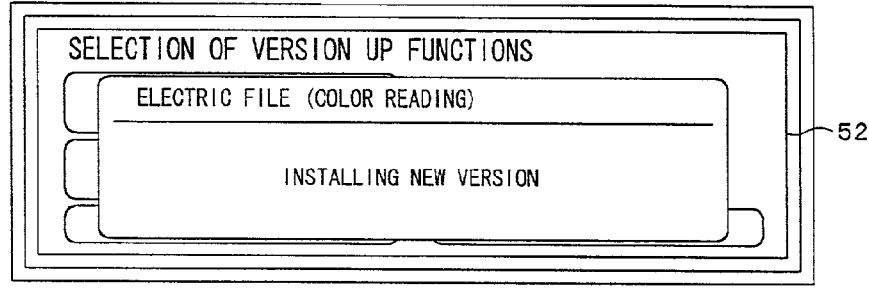
Figure 6:
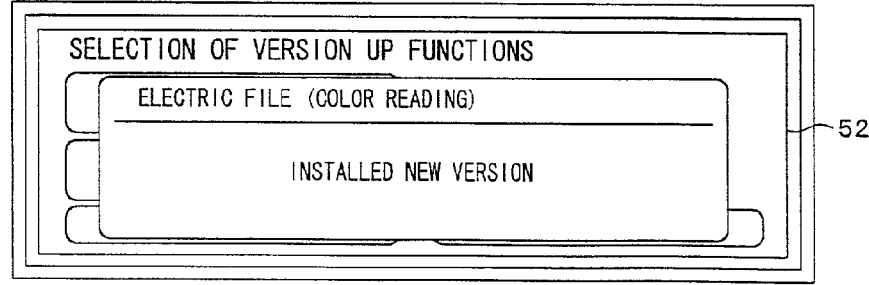

In the server 1, the control section 9, upon receiving the request for the program list from the image forming apparatus 3, instructs the image forming apparatus 3 to transmit the operating environment data via the Internet 2 as shown in FIG. 5.

In the image formation apparatus 3, the control section 15, upon receiving the request for the operating environment data from the server 1, activates the operating environment data generating section 12 and displays "confirming the operating environment" on the display screen 52. The operating environment data generating section 12 judges the operating environment of the image formation apparatus 3, and generates the operating environment data.

Here, the operating environment of the image formation apparatus 3 varies greatly as the user combines various optional units of the image formation apparatus 3 suitably, as mentioned above. For example, if the image formation apparatus 3 is made up by combining the SPF 21A, the black-and-white scanner 22A, the interface 23, the expansion unit 24, the hard disc 25, the memory 26, and the finisher 27C with the printer body 20 of FIG. 4, the operating environment of the image forming apparatus 3 is updated by replacing the black-and-white scanner 22A with the color scanner 22C. The operating environment data generating section 12 judges the new operating environment and generates operating environment data indicative of the new operating environment. The operating environment data generating section 12 transmits the operating environment data via the Internet 2 to the server 1 as shown in FIG. 5.

In the server 1, the operating environment data is given to the operation judging section 7. Here, the list generating section 6 retrieves many programs in the program memory section 4, and obtains all possible programs that can be supplied to the image formation apparatus 3, and gives these programs to the operation judging section 7. The operation judging section 7 judges the operating environment of the image formation apparatus 3 indicated by the operating environment data, and selects programs which can be operated in this operating environment from all the possible programs that can be supplied to the image formation apparatus 3, and the selected programs are informed to the list generating section 6. The list generating section 6 generates a program list showing these programs, and transmits program list via the Internet 2 to the image formation apparatus 3 as shown in FIG. 5.

In the image forming apparatus 3, the control section 15, upon obtaining the program list from the server 1, displays the program list as shown in FIG. 6(c) on the display screen 52. The program list is in the form of a plurality of operation buttons 53. In the operation buttons 53, program titles such as "ELECTRIC FILE (COLOR READING)", "IMAGE EDIT (APPLIED TO BOOK BINDING)", "SCANNER FUNCTION", and "INTERNET FAX" are displayed. These titles are just one example, and the number of the program titles may be large or small.

The title "ELECTRIC FILE (COLOR READING)" indicates the program for providing the image forming apparatus 3 with the color scanner 22C•22D. When the program "ELECTRIC FILE (COLOR READING)" for use in providing the image forming apparatus 3 with the color scanner 22C•22D is selected, document images are read in a plurality of colors and image data of each color is stored in the hard disc. Therefore, the amount of the image data is large and the number of the document images which can be stored is limited.

The program title "image edit (applied to book binding)" indicates the program for use in providing the image forming apparatus 3 with the finisher 27C for stapling two parts and for saddle stitch.

The program title "scanner function" indicates the program for use in reading the document image with the scanner, and in transmitting the image data as an electric mail.

The program title "INTERNET FAX" indicates the program for use in carrying out facsimile communication via a telephone line based on a given telephone number, or in carrying out facsimile communication via the Internet.

Here, since the black-and-white scanner 22A is replaced with the color scanner 22C in the image forming apparatus 3 as described above, the operation button 53 displaying "ELECTRIC FILE (COLOR READING)" is pushed. The control section 15 identifies the operation button 53, and instructs the server 1 to transmit the program "ELECTRIC FILE (COLOR READING)" via the Internet 2 as shown in FIG. 5.

In the server 1, the control section 9, upon receiving the program "ELECTRIC FILE (COLOR READING)", retrieves the program from the program memory section 4, and supplies the program via the Internet 2 to the image forming apparatus 3 as shown in FIG. 5.

In the image forming apparatus 3, the control section 15 displays "INSTALLING NEW VERSION" on the display screen 52 as shown in FIG. 6(d) and stores the program "ELECTRIC FILE (COLOR READING)" in the memory section 13, and thus to execute the program. After executing the program successfully, the control section 15 displays "INSTALLED NEW VERSION" on the display screen 52 as shown in FIG. 6(e), and informs the server 1 via the Internet that confirming operation has been finished, as shown in FIG. 5. Further, the control section 15 finishes communication with the server 1, and disconnects the line.

In the present embodiment, as described above, the operating environment of the image forming apparatus 3 is judged, and the program list showing which program can be operated in the operating environment is generated on the side of the server 1, and the program list is transmitted to the image forming apparatus 3, and the server 1 is then instructed to transmit a program selected from the program list, and the program is supplied from the server 1 to the image forming apparatus 3. That is, the program is selected from the program list which was judged to be operable in the operating environment of the image forming apparatus 3, and is supplied to the image forming apparatus 3. Thus, only the programs that can be operated without fail are supplied to the image forming apparatus 3. Further, since the distributors, i.e., the server 1, can avoid supplying the programs which cannot be operated, service for supplying programs can be improved.

Further, even when the user of the image forming apparatus 3 do not know exactly which program should be installed in providing the image forming apparatus 3 with the color scanner, he/she can select the program which should be installed based on the program list. Further, since the distributor, the server 1, can introduce more programs to the users, service for supplying programs can be improved.

Next, another process of supplying programs by using the program supply system of the present embodiment is described below, referring to FIG. 7.

In the first place, by operating the operation keys 51 on the operation display section 11 or the operation buttons 53 on the display screen 52, the user gives instructions for installing a new version. In response, the control section 15 calls the server 1 via the Internet 2, and requests the server 1 to transmit the program list as shown in FIG. 7.

In the server 1, the list generating section 6 receives the request for the program list, and generates the program list showing many programs which were prepared in advance for the image forming apparatus 3. Then, the list generating section 6 transmits the program list via the Internet 2 to the image forming apparatus 3 as shown in FIG. 7.

In generating the program list, the operating environment of the image forming apparatus 3 is not taken into consideration. Thus, all possible programs which can be supplied to the image forming apparatus 3 are included in the program list. Since the content of the program list is changed only for the convenience of the distributor, the program list may be created in advance and be just supplied thereafter.

Figure 7:
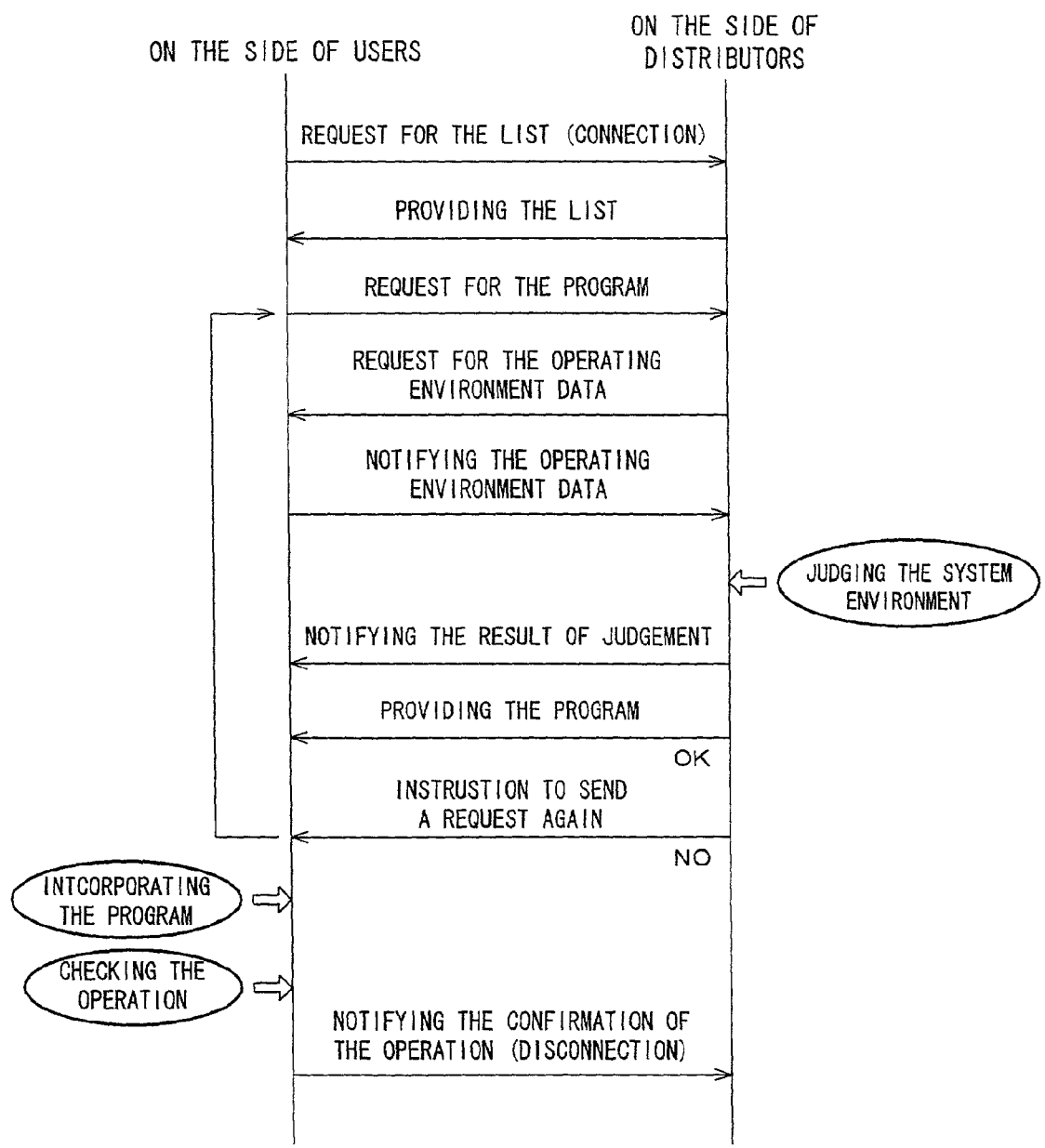
FIG. 7 is an explanatory drawing showing different steps of receiving and transmitting of a program between the server and the complex digital image formation apparatus in the program supply system of the first embodiment.
Figure 8:
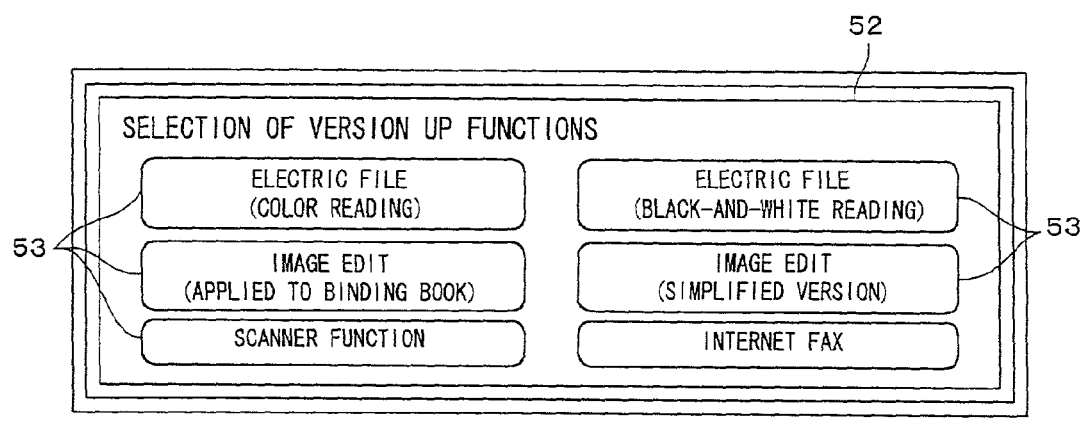
FIG. 8 is an explanatory drawing showing a program list displayed on the display screen of the complex digital image formation apparatus in carrying out the steps of FIG. 7.

In the image forming apparatus 3, the control section 15, upon obtaining the program list from the server 1, displays the program list on the display screen 52, for example, as shown in FIG. 8. When the needed program is selected from the program list by operating the operation keys or the operation buttons, the control section 15 requests the server 1 to transmit the selected program via the Internet 2, as shown in FIG. 7.

Here, since the program list is generated without considering the operating environment of the image forming apparatus 3, the program titles "ELECTRIC FILE (COLOR READING)" and "ELECTRIC FILE (BLACK-AND-WHITE READING)" are both displayed. In these programs, one or the other of the two can be operated in the operating environment of the image forming apparatus 3, and they cannot be operated together. Also, the program titles "IMAGE EDIT (APPLIED TO BOOK BINDING)" and "IMAGE EDIT (SIMPLIFIED VERSION)" are both displayed, but only one of these two programs can be operated in the operating environment of the image forming apparatus 3.

Note that, the program title "ELECTRIC FILE (BLACK-AND-WHITE READING)" indicates the program which can be operated in the operating environment of the image forming apparatus 3 provided with the black-and-white scanner 22A•22B. When "ELECTRIC FILE (BLACK-AND-WHITE READING)" is selected with the black-and-white scanner selected, that is, with the image forming apparatus 3 provided with the black-and-white scanner 22A•22B, the document images are read in black and white, and the data is stored after being compressed, and the number of stored document images becomes large. Even though the black-and-white image data is compressed, the quality of the image does not deteriorate. Further, the program title "IMAGE EDIT (SIMPLIFIED VERSION)" indicates the program for use in providing the image forming apparatus with the finisher 27A•27B only for stapling.

Thereafter, in the server 1, the control section 9, upon receiving the request for the program, requests the image forming apparatus 3 to transmit the operating environment data via the Internet 2 as shown in FIG. 7.

In the image forming apparatus 3, the control section 15, upon receiving the request for the operating environment data from the server 1, activates the operating environment data generating section 12. The operating environment data generating section 12 judges the operating environment of the image forming apparatus 3, and generates the operating environment data, and transmits the operating environment data via the Internet 2 to the server 1 as shown in FIG. 7.

In the server 1, the operating environment data is given to the operation judging section 7. The operation judging section 7 judges the operating environment of the image forming apparatus 3 indicated by the operating environment data, and judges whether the requested program is operable or not. If the program is operable, the control section 9 informs the image forming apparatus 3 that the program can be operated, and the program is supplied to the image forming apparatus 3, as shown in FIG. 7.

In the image forming apparatus 3, the control section 15 displays the result of judgment on the display screen 52 that the program is operable. Further, the control section 15 stores the program in the memory section 13, and tries to execute the program. After executing the program successfully, the control section 15 informs the server 1 via the Internet 2 that confirming operation has been finished, and finishes communication with the server 1, and disconnects the line.

Also, in the server 1, when the program is judged to be inoperable by the operation judging section 7, the control section 9 stores the result of judgment in the user data memory section 5, and informs the image forming apparatus 3 of the judgment result. Thereafter, the control section 9, instead of supplying the program, asks the image forming apparatus 3 to send a request again. The control section 9 then waits for the new request from the image forming apparatus 3.

In the image forming apparatus 3, the control section 15 displays the judgment result on the display screen 52 that the program is inoperable, and displays the program list on the display screen 52 to promote the user to select the needed program again. After the needed program is selected from the program list, the control section 15 requests the server 1 to transmit the selected program via the Internet 2.

Subsequently, in the same manner, in the server 1, whether the program is operable or not in the operating environment of the image forming apparatus 3 is judged. If the program is operable, the program is supplied to the image forming apparatus 3. If the program is inoperable, the image forming apparatus 3 is asked to send a request again.

When the program list including all possible programs which can be supplied to the image forming apparatus 3 is displayed as mentioned above, the programs which cannot be operated in the operating environment of the image forming apparatus 3 are sometimes selected. However, the user of the image forming apparatus 3 requests the server 1 to transmit another program and sees whether the program can be operated or not instead of obtaining the program. Therefore, the user can avoid purchasing useless programs. Further, it is possible for the user to know all possible programs which can be supplied to the image forming apparatus 3. Further, since distributors, i.e., the server 1, store the judgment result of inoperable programs in the user data memory section 5, the distributors can learn users' needs which were not met and also can develop new programs based on the data stored in the user data memory section 5. Thus, it is possible to improve service for supplying the programs.

Note that, the present invention is not restricted to the embodiment mentioned above, and can be embodied in other forms. For example, the present invention can be applied not only to the image forming apparatus, but also to other kinds of user terminals such as a personal computer and a portable terminal, that is, other kinds of user systems. Also, functions of the user systems need not be expanded by the supply of the programs. Especially in the portable terminals, since portability is prioritized, expansion of the functions is not demanded so much, but version up of the program is often demanded, thus the present invention can be applied effectively to the portable terminals. Further, when the number of the programs included in the program list is large, the programs may be divided and included respectively in a plurality of program lists, and a parent list including these program lists is created and is transmitted from the server to the user terminals, and user terminals may request the server to transmit a program list selected from the parent program list, and the program list may be transmitted from the server to the user terminals.

Second Embodiment

The second embodiment of the present invention is described below, based on FIGS. 1, 3, 4, 9, 10.

Conventionally, various apparatuses and methods for supplying programs which are sold and purchased via a network has been proposed, and recently, as the network, computer communication networks as represented by the Internet have been rapidly spreading.

A method and an apparatus for selling and purchasing programs via the network are disclosed, for example, in the following publications. ① WO96/35158 (published date: Jul. 11, 1996) discloses a method and an apparatus for managing ordered programs to protect copyrights of the programs, and ② Japanese Unexamined Patent Publication No. 68058/1989 (Tokukaisho 64-68058)(published date: Mar. 14, 1989) discloses a facsimile apparatus provided with an expanded function using communication means.

In the system where program software is sold and purchased by the method and the apparatuses of ① and ②, the program software is usually paid for based on an electrical settlement.

In the method and the apparatus of ①, when programs are sold and purchased, a buyer or a user first confirms an environment (performance etc of a personal computer for executing the program) needed to operate the program. The user then judges whether the program to be purchased can be operated or not in the operating environment judged by the user. When the user judges that the program is operable, the program is downloaded via the computer communication network. According to the process mentioned above, selling and purchasing the program are completed.

Also, in the facsimile apparatus of ②, programs for expanded functions, which were created by other terminal apparatuses, are installed in the facsimile apparatus via communication means. Thus, functions which were not originally provided when the facsimile was purchased can be operated, thereby expanding the functions.

However, in the system disclosed in ①, whether to purchase the program (soft) or not is decided by the user. Therefore, the user sometimes fails in judging the operating environment of the user's terminal exactly, or overlooks a part of the operating environment, so that the misjudgment is brought about. That is, when the user misjudges the operating environment, the program is installed in the user system whose operating environment is incompetent, and in the worst case, it leads to purchasing a useless program.

Further, in the technique disclosed in ②, the program is simply transmitted and obtained between the other terminal apparatuses and the facsimile apparatus. Therefore, whether the facsimile apparatus has the operating environment where the program can be operated or not is not actually judged. Thus, there are cases, at the time when the program for expanding functions is transmitted, where the operating environment of the facsimile apparatus is insufficient to operate the program. That is, the technique disclosed in ② cannot guarantee proper operation of the facsimile apparatus provided with the expanded functions.

In the system where program software is sold and purchased by the method and the apparatuses of ① and ②, the program software is usually paid for based on an electrical settlement. Thus, even in the case where the program is installed in the user system whose operating environment is insufficient to operate the program, or when the environment of the facsimile device is incompetent to operate the program, the user is asked to pay for the program.

For example, the complex digital image forming apparatuses, which have been marketed as sole products, have been developed in recent years as products having a basic body with various options which are selected in accordance with the users' needs, in order to meet various needs of the users and to feature the characteristics as digital apparatuses.

Especially, in products such as the complex image forming apparatus, not as much as when purchasing but after purchasing, when the user installs a new program or expands the functions, the user needs to judge whether the program or the function is operable in the operating environment (performance etc of the complex digital image forming apparatus) of the user system.

Thus, when expanding functions of a product which enables the user to select various options according to his/her need and combine it with a basic unit, like the complex digital image forming apparatus, there are often cases where the user makes misjudgment and purchases the program which is inoperable and is asked to pay for the program.

Thus, in the program supply system of the second embodiment, an order transmitted from the user system is obtained by the server via the network (communication line) such as computer communication networks (the Internet is the most notable example), and the server who obtained the order for a particular program transmits the program to the user system, and at the same time, judges whether the program has been incorporated (installed) in the user system or not, or whether the environment where the program installed in the user system can be operated has been provided or not, (that is, whether the program which can be operated in the operating environment of the user system has been provided or not), and the server asks the user to pay for the program based on the judgment result that selling and purchasing the program is completed.

That is, in selling the program via the communication line, a manufacturer can confirm whether the ordered program is operating or not in the user system to complete the transmission.

Thus, even when the user purchases the program for expanding functions and the program cannot be operated, the user can avoid being asked to pay for the program, and the user can have more confidence in purchasing the program.

The manufacturer, on the other hand, asks the user to pay for the program after providing the program which can be operated unfailingly, and service for the customers can be improved.

The following describes the second embodiment of the present invention based on an example in which the complex digital image forming apparatus (hereinbelow referred to as an image forming apparatus) is adopted as the user system.

FIG. 1 schematically shows an embodiment of the program supply system of the present invention schematically. The program supply system of the second embodiment is chiefly made up of the image forming apparatus 3 on the side of the user and the server 1 on the side of the manufacturer. The image forming apparatus 3 is connected via the computer communication network as represented by the Internet to the server 1 on the side of the manufacturer. Various data are transmitted and obtained between the image forming apparatus 3 and the server 1 via the communication line. The data may be, for example, a new program which is ordered by the user and is transmitted from the image forming apparatus 3 and is obtained by the server 1 when the functions of the image forming apparatus 3 are to be expanded or a new version is needed therefore.

FIG. 4 shows various options (expansion unit) which are available for the users according to his/her needs with respect to the printer body 20, which is a main body of the image forming apparatus 3. As these options, those described in the first embodiment can be mentioned.

At the time of purchase, the image forming apparatus 3 is either made up of the sole printer body 20 or the printer body 20 with some of the options selected from the options mentioned above. However, after purchasing the image forming apparatus various needs tend to be brought about, as in the case where, for example, the user may want to expand the functions or install a new version. Thus, the present invention supplies a program (software) for expanding the functions from the server 1 via the network to the image forming apparatus 3.

In supplying the program for expanding functions after purchasing the apparatus, it was conventional practice that the user judges whether the program is operable or not in the operating environment of the image forming apparatus 3. However, in the present invention, the manufacturer confirms that the program for expanding functions is operable in the operating environment of the image forming apparatus 3 to complete selling the program. Further, in addition to the operation confirmation by the image forming apparatus 3, before supplying the program, the manufacturer may confirm whether the program is operable or not in the environment of the image forming apparatus 3.

Figure 9:
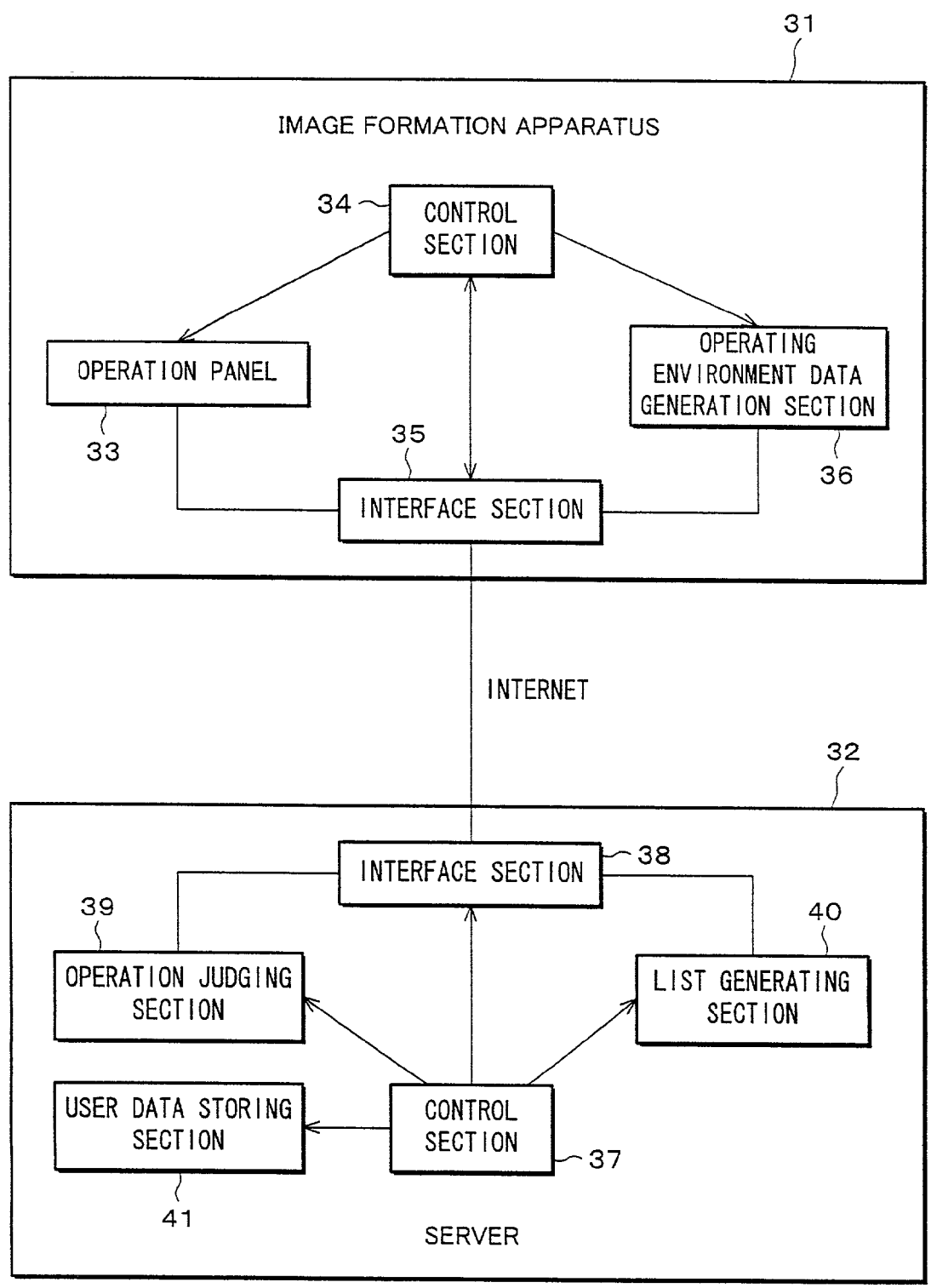
FIG. 9 is a block diagram showing arrangements of a server and a complex digital image formation apparatus in a program supply system of the second embodiment.

FIG. 9 is a block diagram showing an arrangement of the program supply system of the second embodiment. As shown in FIG. 9, the program supply system includes an image forming apparatus 31 as a recipient-electronic-apparatus which can install programs and a server 32 as a supplier-electronic-apparatus which supplies programs.

The image forming apparatus 31 as a recipient-electronic-apparatus includes an operation panel (operation input means, display means) 33, a control section (user operation judging means, operation-confirmation-notification transmitting means) 34 as recipient control means, and an interface section (user-side communication means, operation-confirmation-notification transmitting means) 35, and may further include an environment data generating section (environment data judging means) 36.

The operation panel 33 includes operation means for operating the image forming apparatus 31 and display means for displaying data. The operation, for example, includes the operation for transmitting an order to the server 1. The displayed data, for example, includes the program list transmitted from the server 1. The control section 34 controls operation of the image forming apparatus 31, and also judges operation of the image forming apparatus 31. The interface section 35 connects the image forming apparatus 31 to the server 32 via the communication line such as the Internet. The environment data generating section 36 generates the operating environment data (system environment data) concerning the operating environment of the image forming apparatus 31.

On the other hand, the server 32, as a supplier-electronic-apparatus, includes a control section (accounting means, server-operation-confirming-means) 37 as supplier control means, and an interface section (server-side communication means) 38, and may further include an operation judging section (operation judging means) 39, a list generating section (list generating means) 40, and a user data storing section (storing means) 41.

The control section 37 controls the server 32, judges operation of the program supplied to the image forming apparatus 3, and asks for payment. The interface section 38 connects the server 32 to the image forming apparatus 31 via the communication line such as the Internet. The operation judging section 39 judges whether a predetermined program can be operated or not in the image forming apparatus 31 based on the operating environment data received by the server 32. The list generating section 40 generates the program list which can be supplied from the server 32 based on the judgment given by the operation judging section 39. The user data storing section 41 stores user data received from the image forming apparatus 31.

Taking two examples, the following explains transmitting and obtaining of data such as programs between the image forming apparatus 31 and the server 32 carried out in response to an order transmitted from the image forming apparatus 31 to the server 32. Note that, the pattern of transmitting and obtaining data of the present invention is not restricted to the following.

Figure 10:
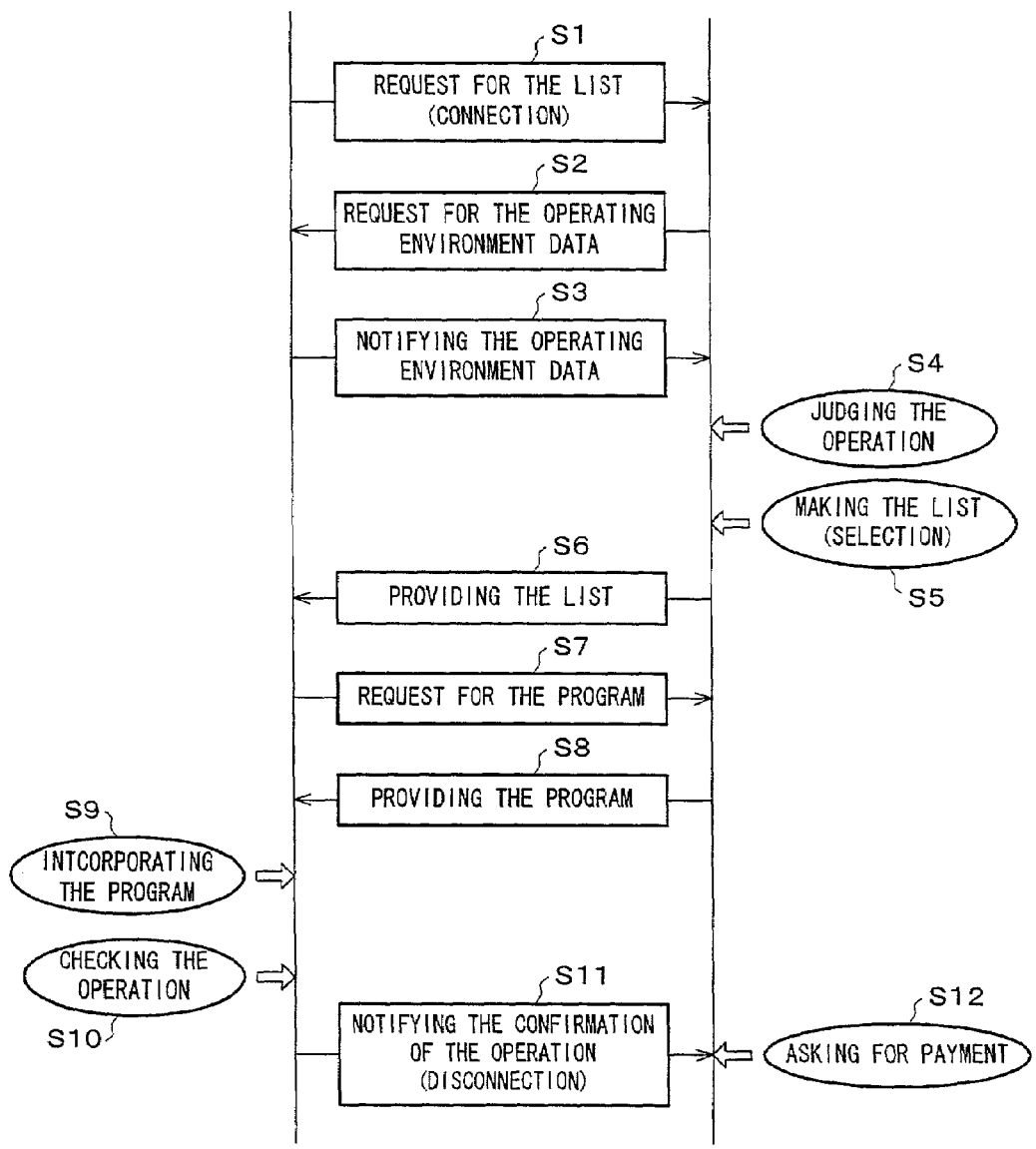
FIG. 10 is an explanatory drawing showing how the server provides a program list prioritizing programs which are likely to be operable in the user system, in the program supply system of the second embodiment.

First, FIG. 10 shows a first pattern of the present embodiment which prioritizes programs that are likely to be operable in the image forming apparatus 31 in providing the program list.

As shown in FIG. 10, when the user wants functions of the image forming apparatus 31 to be expanded, the image forming apparatus 31 requests the server 32 to transmit a list of programs which can be supplied by the server 32 (S1). Requested to transmit the program list, the server 32 on the side of the manufacturer requests the image forming apparatus 31 to send the operating environment data (S2). Responding to the request of S2, the image forming apparatus 31 informs the server 32 of the operating environment data generated in the environment data generating section 36 (S3). The foregoing processes, except for the request for transmitting the program list (S1), may be automatically carried out by the control section 34 and the control section 37 between the image forming apparatus 31 and the server 32.

Next, the server 32 makes the operation judging section 39 judge which program can be operated based on the operating environment data received from the image forming apparatus 31 (S4), and makes the list generating section 40 create, based on the result of judgment, a list of programs which can be supplied by the server 31 and can be operated in the operating environment (system environment) of the image forming apparatus 31 on the side of the user (S5), and supplies the program list to the image forming apparatus 31 (S6).

The image forming apparatus 31 on the side of the user, after receiving the program list generated by the list generating section 40 via the interface 35, shows the list to the user, for example, by displaying the list on the display section of the operation panel 33, and the user selects the program needed by the user and requests (orders) the server 32 to transmit the program (S7). The server 32 on the side of the manufacturer supplies the ordered program to the image forming apparatus 31 (S8).

The user installs (incorporates) the program in the image forming apparatus 31 (S9), and the image forming apparatus 31 checks whether the program thus incorporated can be operated or not in the operating environment of the image forming apparatus 31 (S10) Thereafter, the confirming operation of the incorporated program in the image forming apparatus 31 is finished and this is informed of to the server 32, and the image forming apparatus 31 disconnects the line (S11).

At this stage (S11), the manufacturer judges that the program has been provided in the environment of the image forming apparatus 31 where the program for expanding functions can be operated, and asks the user to pay for the incorporation (purchase) of the program (S12). That is, after the server 32 is informed of the confirmation that the program can be operated, the control section 37 asks for payment.

Thus, in this way, after judging that the program for expanding functions introduced in the image forming apparatus 31 can be operated in the environment of the image forming apparatus 31, the manufacturer asks the user to pay for the incorporation (purchase) of the program for expanding functions. Thus, when the new program for expanding functions cannot be operated, the user can avoid being asked to pay for the program. Therefore, the user can have more confidence in purchasing programs.

On the other hand, after supplying (selling) the function program which can be operated without fail to the image forming apparatus 31, the manufacturer can ask the user to pay for the program. Therefore, service for customers can be improved.

Further, before the user requests the server 32 to transmit the program, the server 32 supplies a list of programs which can be supplied by the server 32 to the image forming apparatus 31. Thus, even when the user does not know specific programs, the user only needs to select the program from the program list provided by the server 32. This improves the convenience of ordering programs via the communication lines.

On the other hand, the manufacturer can provide more product information by providing the program list which can be supplied. Thus, this improves service for customers in selling programs.

Especially, in providing the program list, according to the embodiment of the present invention which prioritizes programs that are likely to be operable, the program list is created (S5) after obtaining the operating environment data from the image forming apparatus 31 (S3). Thus, in providing the program list (S6), it is possible to provide this product information of the programs presumed to be operable without fail in the image forming apparatus 31. As a result, this reduces the incidence of supplying (transmitting) the program which cannot be operated in the image forming apparatus 31. Thus, the manufacturer can further improve the service for customers.

Figure 11:
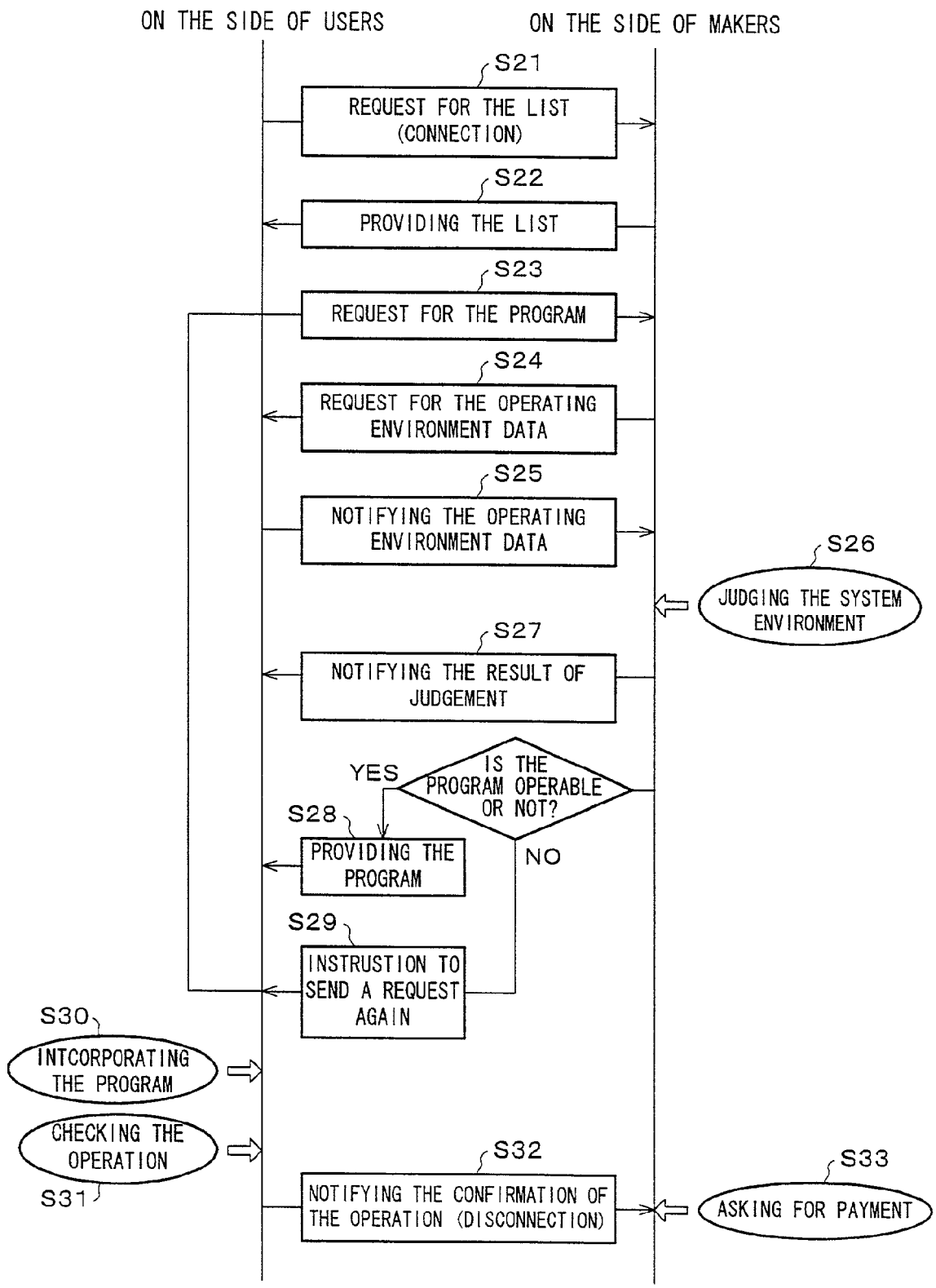
FIG. 11 is an explanatory drawing showing how the server provides a program list prioritizing programs which are requested by the user, in the program supply system of the second embodiment.

The following describes a second pattern of the present invention which prioritizes the program the user wants in supplying the program list, as shown in FIG. 11.

As shown in FIG. 11, when the user wants functions of the image forming apparatus 31 to be expanded, the image forming apparatus 31 via the Internet requests the server 32 on the side of the manufacturer to transmit a list of programs which can be supplied by the server 32 (S21). Requested to transmit the program list, the server 32 on the side of the manufacturer makes the list generating section 40 generate the list of programs which can be supplied, and provides the list to the image forming apparatus 31 on the side of the user (S22).

When the number of programs which can be provided is small, the server 32 only needs to transmit the program list created in advance to the image forming apparatus 31. However, when the number of programs which can be provided is large, the server 32 may generate "a list of lists" according to the kinds of the programs or of the image forming apparatus 31, and may provide "the list of lists" to the image forming apparatus 31 on the side of the user before the program list is provided.

By providing "the list of lists", even when the number of programs which can be provided is large, it is easy for the user to select the program. Thus, convenience for the user can be improved.

Alternatively, at the time when the user requests the server 32 to transmit the list of programs which can be provided by the server 32 (S21), the user may enter data which indicates the program he/she wants. If the user enters such data in S21, the server 32 may create the list according to the data.

The user selects the needed program from the list provided by the server 32, and requests the server 32 to transmit the program (S23). Responding to this, the server 32 requests the image forming apparatus 31 to inform the server 32 of the operating environment data (S24). Responding to the request (S24), the image forming apparatus 31 informs the server 32 of the operating environment data generated in the operating environment generating section 36 (S25).

The server 32 confirms the operating environment data received from the image forming apparatus 31, and makes the operation judging section 39 judge whether the needed program is operable or not in the image forming apparatus 31 (S26), and the image forming apparatus 31 on the side of the user is informed of the confirmation result (S27).

Here, if it is judged in S26 that the needed program is operable in the image forming apparatus 31, the needed program is supplied to the image forming apparatus 31 on the side of the user (S28) following the notification of the confirmation result (S27). Also, when the needed program is provided (S28), it is preferable that the result of judgment is displayed on the display section in the operation panel 33 of the image forming apparatus 31.

On the other hand, if it is judged in S26 that the needed program inoperable in the image forming apparatus 31, the image forming apparatus 31 is instructed, following the notification of the confirmation result (S27), to request the server 32 again to transmit the program list (S29). When the user wants any other program, the server 32 on the side of the manufacturer is requested to transmit a new program (S23) by the image forming apparatus 31 on the side of the user. In the case, S24 and subsequent steps are carried out again to judge whether the newly requested program is operable or not in the image forming apparatus 31.

The program provided by the server 32 is installed (incorporated) in the image forming apparatus 31 (S30), and whether the program can be operated or not in the operating environment of the image forming apparatus 31 is checked (S31). The image forming apparatus 31 then informs the server 32 of the completion of the operation confirmation of the program, and disconnects the line (S32). That is, the control section 34 of the image forming apparatus 31 checks the operation check, and the result of this operation check is transmitted as a notification of operation confirmation via the interface section 35 to the server 32.

At this stage, the manufacturer judges that the environment where the program for expanding functions incorporated in the image forming apparatus 31 can be operated has been provided, that is, the program has been provided in the environment where the program can be operated, and asks the user to pay for the incorporation (purchase) of the program (S33).

Thus, after judging that the program for expanding functions incorporated in the image forming apparatus 31 is operable in the environment of the image forming apparatus 31, the manufacturer asks the user to pay for the incorporation (purchase) of the program for expanding functions. Thus, when the new program for expanding functions is inoperable, the user can avoid being asked to pay for the program. Therefore, the user can have more confidence in purchasing programs can be improved. Therefore, the user can have more confidence in purchasing programs.

On the other hand, the manufacturer can ask the user to pay for the program after supplying (selling) the program which can be operated without fail to the user. Therefore, service for customers can be improved.

In this method, the user requests the server 32 to transmit the program before the server 32 on the side of the manufacturer requests the image forming apparatus 31 to send the operating environment data. Thus, users' needs can be prioritized. However, there are cases where the users' needs may not be included in the programs which can be supplied by the server 32.

Thus, in the server 32 on the side of makers, when the operation judging section 39 judges that the needed program received from the image forming apparatus 31 is inoperable, the program needed by the user and the result of judgement are stored as user data in the user data storing section (storing means) 41. By this, the next time when the user makes an order or when the user changes the system, the server can provide, for example, information of program needed by the user which became available, based on the judgement result stored as the user data. Thus, a new service which is more responsive to the users' needs can be provided. As a result, the manufacture can improve the service for customers.

Next, operation of the image forming apparatus 31 is described. FIG. 3 shows the operation panel 33 which serves as operating means and display means. The operation panel 33 includes the operation keys 51 with various keys and the display screen 52 made up of LCD (Liquid Crystal Display) and the like. The operation panel 33 may be provided with other operating means. Further, in the embodiment, the display screen 52 is a touch panel, and thus the display screen 52 itself functions as operating means. That is, as described in the first embodiment, pushing any button of the operating buttons 53 displayed on the display screen 52 makes it possible to give various instructions to the control section 34.

Figure 12:
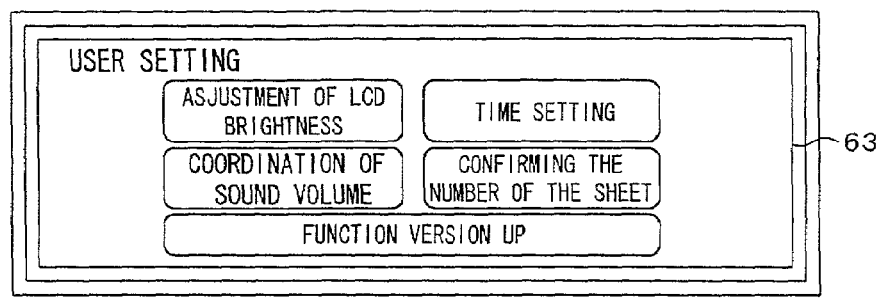
FIG. 12(a) is an explanatory drawing showing a concrete display content on a display screen of a complex digital image formation apparatus in carrying out the steps of FIG. 11.
FIG. 12(b) is an explanatory drawing showing a concrete display content on a display screen of a complex digital image formation apparatus in carrying out the steps of FIG. 11.
FIG. 12(c) is an explanatory drawing showing a concrete display content on the display screen of the complex digital image formation apparatus in carrying out the steps of FIG. 11.
FIG. 12(d) is an explanatory drawing showing a concrete display content on the display screen of the complex digital image formation apparatus in carrying out the steps of FIG. 11.
FIG. 12(e) is an explanatory drawing showing a concrete display content on the display screen of the complex digital image formation apparatus in carrying out the steps of FIG. 11.
Figure 12:
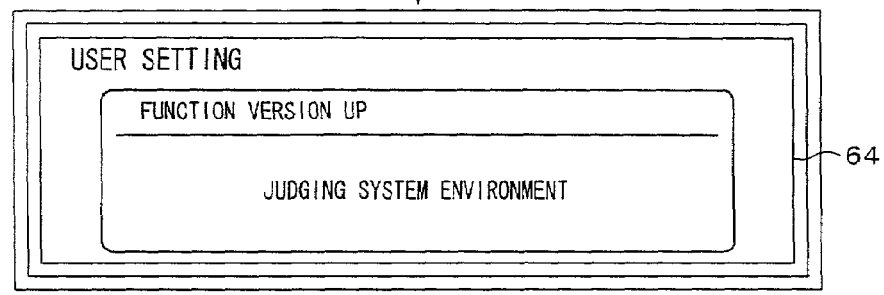
Figure 12:
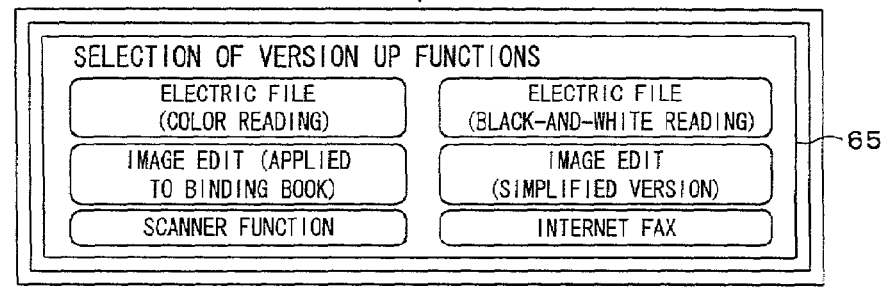
Figure 12:
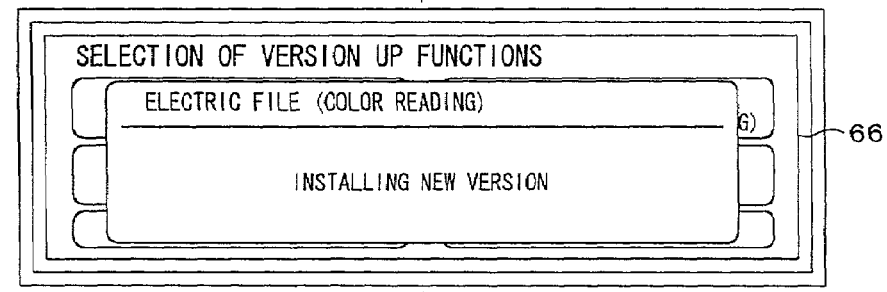
Figure 12:
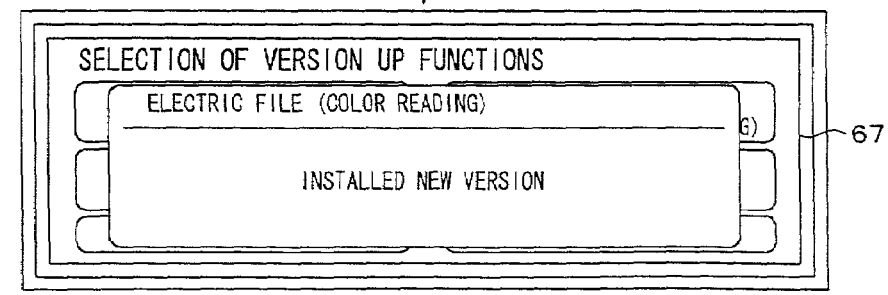

When the user wants to install a new version in the image forming apparatus 31, the user pushes the key of the user setting in the operating keys 51. Then as shown in FIG. 12(a), in the display screen 52, a basic screen changes into a screen 63 for user setting. In the screen 63 for user setting, touch keys of various user setting items are displayed, and a key for function version up is selected when expanding functions of the image forming apparatus 31.

Here, in the present embodiment, the control section 34 of the image forming apparatus 31 requests the server 32 to transmit the list (S1, S21), receives a request for the operating environment data (S2, S24) and transmits the operating environment data (S3, S25), and receives the list (S6, S22), all automatically. Thus, in the display screen 52, as shown in FIG. 12(b), a system environment confirming screen 64 such as "CONFIRMING THE SYSTEM ENVIRONMENT" is displayed.

Thereafter, as shown in FIG. 12(c), a list display screen 65, for example, such as "SELECT VERSION UP FUNCTION" is displayed. As concrete examples of version up functions, a list of keys including electric file (color reading), electric file (black-and-white reading), image edit (applied to book binding), image edit (simplified version), scanner function, and Internet FAX are displayed on the list display screen 65.

The functions of these keys correspond to the options (expanding units) and the like as shown in FIG. 4, and operate these options. The keys correspond to the functions described below respectively.

The key of the electric file (color reading) corresponds to a function by which images are read in colors and the read images are stored in a hard disc (HD) 25. Since the images are read in colors, the amount of data of read images is large. Thus, the number of images which can be stored in the hard disc 25 is limited.

The key of electric file (black-and-white reading) corresponds to a function by which images are read in black and white, and the read images are stored in the hard disc (HD) 25. The images are read in black and white, and thus even when the black-and-white image data is compressed, the quality of image does not deteriorate. Thus, the number of images which can be stored in the hard disc 25 can be increased.

The key of image edit (applied to book binding) corresponds to, for example, a function for editing images in high-quality enough to bind books. Meanwhile, the key of image edit (simplified version) corresponds to a simpler function compared with the function of the image edit (applied to book binding), for example, a function just for gathering and stapling sheets of paper.

The key of scanner function, for example, corresponds to a function for transmitting a scanned image as electric mail. The key of Internet FAX corresponds to a function for carrying out the FAX function, via a telephone line (if it has a telephone number) or a net (if it is connected to the net).

For example, when the user selects the key of electric file (color reading) in the list display screen 65, the operation judging section 39 of the server 32 judges whether the program and the option of the electric file (color reading) of the selected key can be operated in the image forming apparatus 31 (S4, S26), and the program is supplied from the server 32 to the image forming apparatus 31 (S8, S28).

The program supplied to the image forming apparatus 31 is installed (incorporated) in the image forming apparatus 31 (S9, S30). While the program is being installed, as shown in FIG. 12(d), an install display screen 66, for example, such as "INSTALLING A NEW VERSION" is displayed on the display screen 52. After the program has been installed, whether the installed program is operable or not is checked (confirmed), and when the check is finished (S10, S31), as shown in FIG. 12(e), an operation judging display screen 67, for example, such as "INSTALLED A NEW VERSION" is displayed on the display screen 52.

At this stage, the image forming apparatus 31 checks whether the supplied program can be operated or not in the environment of the image forming apparatus 31 (S10, S31), and informs the server 32 on the side of the manufacture of the operation confirmation (S11, S32).

In the image forming apparatus 31 whose function is expanded, as a method for confirming the operation of the expanded function, for example, there is a common method by which the server 32 monitors how the expanded function is being operated, using a remote monitoring system (e.g. RIC;

Xerox's registered trademark). In confirming the operation by using this method, after confirming the expanded function by the remote monitoring system, the manufacturer asks the user to pay for the introduction of the program of the expanding function.

As described above, in the present invention, when programs are purchased or sold via computer communication networks as represented by the Internet so as to update or expand the version or functions of the image forming apparatus 31, the manufacturer asks the user to pay for the program demanded by the user after the server 32 on the side of the manufacturer confirms the operation of the program in the image forming apparatus 31.

Therefore, even when the program for expanding functions purchased by the user is inoperable, the user can avoid being asked to pay for the program, and thus the user can have more confidence in purchasing programs 124. On the other hand, the manufacturer asks the user to pay for the program after confirming the environment of the image forming apparatus 31 in which the program can be operated without fail, that is, after confirming that the program has been provided in the environment where the program can be operated. Thus, service for clients can be improved.

Though the image forming apparatus 31 is described as an example of an electronic apparatus on the receiving end in the present embodiment, the present invention is not restricted to this. That is, the present invention can be suitable used in any apparatus whose version or functions can be updated or expanded via communication lines such as the computer communication network as represented by the Internet.

Concrete examples of apparatuses other than the image forming apparatus 31 are a personal computer and a portable terminal, etc. The functions of the electronic apparatus on the receiving end need not be necessarily expanded. For example, since portability is prioritized in portable terminals, expandability is sometimes not included, but updating of program versions is demanded greatly even in portable terminals which has no expandability. Therefore, even when an electronic apparatus at the receiving end which has no expandability like the portable terminal is used as the image forming apparatus 31, the present invention can be suitably applied, for example, to update the program version.

Note that, a first program selling method is that the user is asked to pay for the program after the program (software) is obtained via the communication line and after whether the program is confirmed to be operable in the apparatus.

A second program selling method is a method in which an order transmitted by the image forming apparatus via the computer communication network is received by the server, wherein, in response to an order for a certain program, the ordered program is incorporated in the image forming apparatus, and the server asks the user to pay for the program at the time when the operation state of the program in the image forming apparatus is confirmed.

The program supply method of the present invention may include the step of displaying a result of judgement on whether the program is operable or not in the user system.

Further, the program supply method of the present invention may include the step of transmitting an order for the program from the user system via the network to the server when the program is judged to be operable.

In this manner, by ordering the program after confirming whether the program can be operated or not in the operating environment of the terminal, the user can avoid purchasing a useless program. Further, since distributors can avoid selling programs which cannot be operated, service for supplying programs can be improved.

Also, the program supply method may include the steps of generating a program list made up of programs which can be supplied from the server, transmitting the program list from the server via the network and to the user system, and selecting a program from the program list.

In this manner, by providing the program list to the user system and allowing the user to select a program from the program list, the user can select a needed program from a variety of programs appropriately and utility for users can be improved. On the distributors' side, the server can introduce more programs to the users, and service for supplying programs can be improved.

Further, the program supply method may include the steps of generating a program list made up of programs which can be operated in the operating environment of the user system, transmitting the program list from the server via the network and to the user system, and selecting a program from the program list.

In this manner, by thus providing the program list made up of programs which can be operated in the operating environment of the user system to the user system, a program selected by the user can be operated in the user system as long as the program is selected from the program list.

Also, the program supply method may include the step of storing the result of judgement as data of the user system in the server when the program is judged to be inoperable.

In this manner, by thus storing the result of judgement on the side of the server that the program is inoperable, distributors can learn users' needs which were not met by the server and also can develop new programs to meet the users' needs. Thus, service for supplying programs can be improved.

Also, the program supply method may include the step of expanding functions of the user system when a program supplied from the server via the network to the user system is installed.

That is, functions of the user system are expanded based on a newly installed program.

A program supply method of the present invention includes the steps of: receiving by a server an order for a program via a network from a user system; transmitting a program in response to the order via the network to the user system; and asking a user to pay for the program after confirming that the program is operable in the user system.

According to this method, in selling programs via a network such as a computer communication network as represented by the Internet, selling a program is completed and the server asks the user to pay for the program after confirming that the program transmitted from the server to the user system is operable or not in the environment of the user system.

Therefore, even when the program cannot be operated in the user system, the user can avoid being asked to pay for the program. Thus, the user can have more confidence in purchasing programs via the communication lines.

On the other hand, the manufacturer asks the user to pay for the program after providing (selling) the program which can be operated without fail in the user system, and service for customers can be improved.

The program supply method may include the step of requesting the user system by the server to inform the server of an operating environment via the network.

According to this method, the operating environment data informed of by the user system can be stored as the user data in the user data storing section by the server. That is, the server can receive the operating environment data of the user system transmitted by the user system in response to the request for informing the server of the operating environment, and can store the operating environment in the user data storing section.

Thus, at the time of the next order or when the system is changed, a new service for the operating environment of the user system can be provided for the user based on the user data. As a result, the manufacturer can improve service for customers more.

The program supply method may include the step of generating by the server a program list made up of programs which are operable in the user system and which can be provided by the server, and providing the program list via the network to the user system.

According to this method, the program list made up of programs which can be operated in the user system and can be provided by the server can be provided to the user system.

Thus, even when the user does not know concrete programs, the user can select the needed program from the program list provided by the server. This makes it easier to select the needed program.

On the other hand, the manufacturer can provide, based on the list, information, for example, as to whether which program is operable in the environment of the user system. Thus, the manufacturer can provide more product information to users, and service for customers can be further improved.

The program supply method may include the step of storing by the server an operating environment of the user system.

According to this method, the operating environment informed of by the user system can be stored in the program supply system. Thus, the manufacturer can further improve service for customers based on the environment data.

Next, in a program supply system of the present invention which supplies programs from the server via the network to the user system, the user system includes operating environment judging means for judging an operating environment of the user system, and before having a program supplied, transmits the judged operating environment via the network to the server, and the server includes operation judging means for judging whether the program is operable or not in the received operating environment, and transmits a result of judgement as to whether the program is operable or not via the network to the user system.

According to this program supply system, whether the program can be operated or not in the operating environment of the user system is judged, and the result of judgement is transmitted to the user system. Thus, the server, i.e., the distributor, can sell a program which can be operated without fail, after confirming that the program can be operated, thus improving service for providing programs.

Further, the user system of the program supply system may include operation input means to be operated by a user; and display means for displaying data, the user system is activated in response to operation on the operation input means, and the user system transmits the operating environment judged by the operation environment judging means via the network to the server, and displays the result of judgement given by the operation judging means of the server on the display means.

Further, the user system of the program supply system may order the program to the server when the result of judgement received from the server indicates that the program is operable.

In this manner, by thus ordering a program after confirming whether the program can be operated or not in the operating environment of the terminal on the side of the user system, the user can avoid purchasing useless programs. Further, the distributor can avoid selling useless programs, and service for providing programs can be improved.

Further, the server of the program supply system may include storing means for storing data of the user system.

In this manner, by thus storing the user system data in the server, a new program for the user system can be developed. Thus, service for providing programs can be improved.

Further, the user system of the program supply system may expand its functions when a program supplied via the network from the server is installed.

In this way, newly installed programs enable functions of the user system to be expanded.

Further, the user system of the program supply system may be any of a personal computer, a portable terminal, and a complex digital image forming apparatus.

Further, the server of the program supply system may include list generating means for generating a program list made up of programs which can be supplied to the user system, and transmits the program list via the network to the user system, and the user system displays the program list on the display means, and selects a program from the program list according to operation on the operation input means.

In this manner, by thus providing the program list to the user system and allowing the user to select a program from the program list, it is possible to select a needed program from a variety of programs appropriately. This improves utility of programs for the users. Further, the distributor on the side of the server can introduce more programs to the user. Thus service for providing programs can be improved.

Further, the server of the program supply system may include list generating means for generating a program list made up of programs which are operable in the operating environment of the user system, and transmits the program list via the network to the user system, and the user system displays the program list on the display means and selects a program from the program list according to operation on the operation input means.

In this manner, by thus providing the program list made up of programs which can be operated in the operating environment of the user system, a program selected by the user can be operated in the user system as long as the program is selected from the program list.

Further, the server of the program supply system may store the result of judgement by the operation judging means when the program is judged to be inoperable.

In this manner, by thus storing the result of judgement in the server that the program is inoperable, the server can learn users' needs which were not met by the server and also can develop new programs to meet the users' needs. Thus, service for supplying programs can be improved.

A program supply system of the present invention is a system which transmits a program in response to an order received via a network from a user system to the user system via the network, and includes: server operation judging means for confirming an operation state of the program in the user system; and accounting means for asking a user to pay for the program after confirming the operation of the program.

According to the arrangement, selling the program is completed, and the accounting means asks the user to pay for the program after the operation confirming means on the side of the server confirms that the program is operable in the environment of the user system.

Thus, the user can have more confidence in purchasing programs via the network, and the manufacturer can improve service for the clients.

A program receiving method of the present invention includes the steps of: transmitting by a user system an order for a program via a network to a server; receiving the program in response to the order from the server via the network; confirming operation of the program; and transmitting a notification of operation confirmation to the server so as to allow the server to confirm an operation state of the program.

According to this method, informed of the confirmation that the program can be operated in the user system, the server can ask the user to pay for the purchased program. Therefore, the user can avoid being asked to pay for the program which was introduced in the system where the operating environment is incompetent.

Note that, in view of unauthorized acquisition of programs, it is preferable that the operation confirming step and the step of transmitting the operation confirmation notification of the program receiving method of the present invention are, for example, linked to each other under the control of software.

The program receiving method of the present invention may further include the step by the image forming apparatus of informing the server via the communication line of the operating environment.

According to this method, the server can provide programs based on data informed of by the image forming apparatus. Thus, the user can obtain data, for example, such as programs having a high probability of being compatible with the environment of the image forming apparatus.

A program receiving apparatus of the present invention which receives a program via a network from a server includes user operation judging means for confirming operation of the program; and operation confirmation notification transmitting means for transmitting a notification of operation confirmation to the server so as to allow the server to confirm an operation state of the program.

According to this arrangement, the operation judging means on the side of the user confirms whether the program can be operated or not in the user system, and the result of confirmation that is transmitted to the server by the operation confirmation notification transmitting means. This enables the server to ask the user to pay for the program based on the notification of operation confirmation that the program can be operated. Therefore, the user can avoid being asked to pay for the program which was introduced in a system with incompetent operating environment.

The program receiving of the present invention may include environment data transmitting means for transmitting the operating environment of the program receiving apparatus to the server.

According to this arrangement, the server can provide programs based on the data informed of by the program receiving apparatus. Thus, the user can obtain data such as program having a high probability of being compatible with the environment of the user system.

A program supply system of the present invention includes (1) a program supply system which transmits a program in response to an order received via a network from a user system to the user system via the network, including: server operation judging means for confirming an operation state of the program in the user system; and accounting means for asking a user to pay for the program after confirming the operation of the program, and (2) a program receiving apparatus for receiving a program from a server via a network, including: operation judging means on the side of the user for confirming operation of the program; and operation confirmation notification transmitting means for transmitting a notification of operation confirmation to the server so as to allow the server to confirm an operation state of the program, (1) the program supply system and (2) the program receiving apparatus being connected via a network.

According to this arrangement, as with the program supply method of the present invention, selling the program is completed after confirming that the program can be operated in the environment of the user system, and the user is asked to pay for the program. Thus, the user can have more confidence in purchasing programs via the communication line, and the manufacturer can improve service for the clients.

A computer-readable recording medium according to the present invention stores a program for executing the program supply method according to the present invention or a program for executing the program receiving method of the present invention.

Thus, when the programs are executed by a computer, as with the program supply method or the program receiving method of the present invention, selling the program is completed after confirming that the program can be operated in the environment of the user system, and the user is asked to pay for the program. Thus, the user can have more confidence in purchasing programs via the communication line, and the manufacturer can improve service for the clients.

Finally, a recording medium which is attachable/detachable with respect to a computer may be used as the recording medium in which the program for executing the program supply method and the program receiving method of the present invention are recorded. Examples of the recording medium include media which carry programs fixedly, including: tapes such as a magnetic tape and cassette tape; magnetic discs such as a floppy disc and a hard disc; optical discs such as a CD-ROM, MO, MD, DVD; cards such as an IC card (including a memory card) and a photo card; and semiconductor memories such as a mask ROM, EPROM, EEPROM, and a flash ROM.

Further, the program supply system of the present invention may be adapted to be able to connect to the communication network including the Internet, and may transfer programs between the program supply system and other system computers via transfer media such as the communication network.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A program supply method for transmitting a program from a server via a network to a user system to which one or more expansion units are attached, the method comprising:
   transmitting a request from the user system via the network to the server without selecting specific program-related information, the request requesting the server to provide a list of programs which can be supplied by the server;
   transmitting an operating environment of the user system from the user system via the network to the server;
   providing, from the server to the user system, a program list which prioritizes programs that are likely to be operable in the operating environment of the user system based on the operating environment transmitted from the user system;
   after a program is selected from the program list, transmitting the program from the server to the user system;
   executing the program on the user system after the program is supplied from the server and installed on the user system to thereby confirm proper operation of each expansion unit by the program; and after receiving confirmation at the server of proper operation of each expansion unit of the user system, requesting payment for the program.

2. The program supply method as set forth in claim 1, further comprising displaying the result of the judgment as to whether the program is operable or not in the operating environment of the user system.

3. The program supply method set forth in claim 1, further comprising storing the result of the judgment as data of the user system in the server when the program is judged to be inoperable.

4. The program supply method set forth in claim 1, further comprising expanding functions of the user system in which the program supplied from the server via the network to the user system is installed.

5. The program supply method of claim 1, further comprising:
   sending a confirmation to the server if the proper operation is confirmed by the executing.

6. A program supply method, comprising:
   transmitting a request from a user system to a server without selecting specific program-related information, the request requesting the server to provide a list of programs which can be supplied by the server to the user system to which one or more expansion units are attached;
   transmitting an operating environment of the user system from the user system to the server;
   providing, from the server to the user system, a program list which prioritizes programs that are likely to be operable in an operating environment of the user system based on the operating environment transmitted from the user system;
   receiving by the server via a network from the user system an order for a program selected from the program list;
   transmitting the program in response to the order via the network to the user system;
   executing, in the user system, the transmitted program to thereby confirm proper operation of each expansion unit by the program; and
   requesting by the server payment for the program after receiving confirmation of proper operation of each expansion unit of the user system.

7. The program supply method set forth in claim 6, further comprising requesting the user system by the server to inform the server of an operating environment via the network.

8. The program supply method set forth in claim 6, further comprising storing by the server of an operating environment of the user system.

9. A program supply system which supplies programs from a server via a network to a user system to which one or more expansion units are attached,
   wherein:
   said user system includes transmitting means for transmitting a request to the server without selecting specific program-related information, the request requesting the server to provide a list of programs which can be supplied by the server to the user system, and operating environment judging means for judging an operating environment of the user system, and before having a program supplied, the transmitting means transmits the judged operating environment via the network to the server,
   said server includes list generating means for generating a program list which prioritizes programs that are likely to be operable in the operating environment of the user system based on the judged operating environment transmitted from the user system, and transmitting means for transmitting the program list via the network to the user system,
   said user system selects a program from the program list according to an input thereto,
   said user system executes the program after the program is supplied from the server and installed on the user system to thereby confirm proper operation of each expansion unit by the program, and
   if said server receives confirmation of proper operation of each expansion unit of the user system, said server requests payment for the program from said user system.

10. The program supply system set forth in claim 9, wherein said user system includes:
    operation input means to be operated by a user; and
    display means for displaying data,
    said user system is activated in response to operation on the operation input means, and the user system transmits the operating environment judged by the operation environment judging means via the network to the server, and displays the result of the judgment given by the operation judging means of the server on the display means.

11. The program supply system set forth in claim 9, wherein said server further includes storing means for storing data of the user system.

12. The program supply system set forth in claim 11, wherein said server stores the result of the judgment by the operation judging means when the program is judged to be inoperable.

13. The program supply system set forth in claim 9, wherein said user system expands its functions when the program supplied via the network from the server is installed.

14. The program supply system set forth in claim 9, wherein said user system is any of a personal computer, a portable terminal, and a complex digital image forming apparatus.

15. The program supply system of claim 9, wherein said user system is further operable to send a confirmation to the server if the proper operation is confirmed by the execution.

16. A program supply system which supplies programs from a server via a network to a user system to which one or more expansion units are attached,
    wherein:
    said user system includes:
    operating environment judging means for judging an operating environment of the user system; and
    user-side communication means for transmitting data to and receiving data from the server via the network, the transmitted data including a request to the server without selecting specific program-related information, the request requesting the server to provide a list of programs which can be supplied by the server to the user system, and the judged operating environment,
    said server includes:
    server-side communication means for transmitting data to and receiving data from the user system via the network;
    list generating means for generating a program list which prioritizes programs that are likely to be operable in the operating environment of the user system based on the judged operating environment transmitted from the user system, and transmitting the program list via the server-side communication means to the user system,
    and further wherein
    said user system is operable to execute the program after the program is supplied from the server and installed on the user system to thereby confirm proper operation of each expansion unit by the program, and upon said server receiving confirmation of the proper operation of each expansion unit of the user system, said server requests said user system for payment for the program.

17. The program supply system of claim 16, wherein said user system is further operable to send a confirmation to the server if the proper operation is confirmed by the execution.

18. A program supply system which transmits a program in response to an order received via a network from a user system, to which one or more expansion units are attached, to the user system via the network, the system comprising:
 server-side list generating means for generating, in response to a request transmitted to the program supply system from the user system without selecting specific program-related information, a program list which prioritizes programs that are likely to be operable in an operating environment of the user system based on the operating environment transmitted from the user system, and transmitting the program list to the user system;
 server-side operation judging means for confirming an operation state in the user system of each expansion unit by a program selected from the program list; and
 accounting means for asking a user to pay for the program after proper operation of the program in the user system is confirmed.

19. A program receiving method, comprising:
 transmitting, by a user system to which one or more expansion units are attached, a request to a server without selecting specific program-related information, the request requesting the server to provide a list of programs which can be supplied by the server;
 transmitting, by the user system, an operating environment of the user system to the server;
 receiving, by the user system, a program list sent from the server which prioritizes programs that are likely to be operable in an operating environment of the user system based on the operating environment transmitted from the user system;
 transmitting by the user system via a network to the server an order for a program selected from the program list;
 receiving the program from the server via the network in response to the order;
 executing the program to thereby confirm proper operation of each expansion unit by the program;
 transmitting a notification of operation confirmation via the network to the server to allow the server to confirm the proper operation state of each expansion unit of the user system; and
 receiving a request for payment for the program from the server after the proper operation state is confirmed.

20. A program receiving apparatus, to which one or more expansion units are attached, for receiving a program from a server via a network, comprising:
 user-side transmitting means for transmitting a request via the network to the server without selecting specific program-related information, the request requesting the server to provide a list of programs which can be supplied by the server to the user system, and for transmitting an operating environment of the user system from the user system via the network to the server;
 user-side receiving means for receiving from the server a program list which prioritizes programs that are likely to be operable in an operating environment of the program receiving apparatus based on the operating environment transmitted from the user system and for receiving from the server a program selected from the program list;
 user-side operation judging means for executing the received program, thereby confirming proper operation of each expansion unit by the program;
 operation confirmation notification transmitting means for, upon the user-side operation judging means executing the received program, transmitting a notification of operation confirmation to the server to allow the server to confirm the proper operation state of each expansion unit; and
 the user-side receiving means receiving a request for payment for the program from the server after the proper operation state is confirmed.

21. A program transmitting and receiving system, comprising:
 a program supply system comprising:
  server-side list generating means for providing to a user system to which one or more expansion units are attached a program list which prioritizes programs that are likely to be operable in an operating environment of the user system;
  server-side operation judging means for confirming an operation state in the user system of a program selected from the program list; and
  accounting means for asking a user to pay for the program after confirming the operation of each expansion unit by the program;
 a program receiving apparatus comprising:
  user-side transmitting means for transmitting a request to the program supply system without selecting specific program-related information, the request requesting the program supply system to provide a list of pro grams which can be supplied by the program supply system to the user system, and for transmitting the operating environment of the user system from the user system to the server;
  user-side operation judging means for executing the program, thereby confirming proper operation of each expansion unit of the user system; and
  operation confirmation notification transmitting means for, upon executing the program, transmitting a notification of operation confirmation to the server so as to allow the server to confirm the proper operation state of each expansion unit of the user system; and
 wherein the program supply system and the program receiving apparatus are connected to each other via a network, and
 wherein the prioritized program list is based on the operating environment transmitted from the user system.

22. A computer-readable recording medium having a program for executing the program receiving method of claim 1 recorded thereon.

23. A computer-readable recording medium having a program for executing the program receiving method of claim 19 recorded thereon.

24. A method performed by a user system, to which one or more expansion units are attached, to obtain a program from a server, comprising:
 transmitting from the user system to the server a request without selecting specific program-related information, the request requesting the server to provide a list of programs which can be supplied by the server to the user system;
 transmitting from the user system to the server an operating environment of the user system;
 receiving from the server a program list prioritizing programs that are likely to be operable in the operating environment of the user system based on the operating environment transmitted from the user system;

sending to the server a request for one of the programs selected from the list;

receiving the selected program from the server;

installing the received program;

executing the installed program to confirm proper operation of each expansion unit by the program;

sending to the server a notification regarding the confirmation of operation; and receiving a request for payment for the program from the server after the sending of notification.

25. A program supply method for supplying programs to an image formation apparatus to which one or more expansion units are attached, the method comprising:

transmitting from the image formation apparatus to a server a request without selecting specific program-related information, the request requesting the server to provide a list of programs which can be supplied by the server to the image formation apparatus;

transmitting from the image formation apparatus to the server an operating environment of the image formation apparatus;

receiving from a server a program list, based on the operating environment transmitted from the image formation apparatus, which prioritizes programs that are likely to be operable in the operating environment of the image formation apparatus;

sending to the server a request for one of the programs selected from the list;

receiving the selected program from the server;

installing the received program;

executing the installed program to confirm proper operation of the each expansion unit by the program in an operating environment of the image formation apparatus;

sending to the server a notification regarding the confirmation of proper operation; and receiving a request for payment for the program from the server after the sending of notification.

* * * * *